(12) United States Patent
Sattler et al.

(10) Patent No.: US 11,859,133 B2
(45) Date of Patent: Jan. 2, 2024

(54) SIZE-REVERSING MATERIALS FOR REFORMING IN CYCLIC FLOW REACTORS

(71) Applicant: ExxonMobil Technology and Engineering Company, Annandale, NJ (US)

(72) Inventors: Wesley Sattler, Bedminster, NJ (US); Keith R. Hajkowski, Somerset, NJ (US); Changmin Chun, Raritan, NJ (US); Partha Nandi, Annandale, NJ (US); Vera Grankina, Doylestown, PA (US); Joseph E. Gatt, Annandale, NJ (US); Ning Ma, Whitehouse Station, NJ (US); Anastasios Skoulidas, Pittstown, NJ (US); William R. Gunther, Clinton, NJ (US); Everett J. O'Neal, Asbury, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 17/496,644

(22) Filed: Oct. 7, 2021

(65) Prior Publication Data

US 2022/0112432 A1    Apr. 14, 2022

Related U.S. Application Data

(60) Provisional application No. 63/090,880, filed on Oct. 13, 2020.

(51) Int. Cl.
  *C10G 11/04*    (2006.01)
  *C10G 11/22*    (2006.01)
  (Continued)

(52) U.S. Cl.
  CPC ............... *C10G 11/04* (2013.01); *B01J 8/008* (2013.01); *B01J 21/04* (2013.01); *B01J 23/002* (2013.01);
  (Continued)

(58) Field of Classification Search
  CPC ...... B01J 19/2485; B01J 21/04; B01J 21/066; B01J 2208/00017; B01J 2208/00548;
  (Continued)

(56) References Cited

U.S. PATENT DOCUMENTS 4,511,673 A    4/1985    Eto
4,888,131 A    12/1989   Goetsch et al.
(Continued)

FOREIGN PATENT DOCUMENTS

CA    2 675 868 A1    3/2010
CN    107376918 A     11/2017
(Continued)

OTHER PUBLICATIONS

International Search Report and Written Opinion received for PCT Application No. PCT/US2021/062626, dated Apr. 7, 2022, 13 Pages.
(Continued)

*Primary Examiner* — Ellen M McAvoy
*Assistant Examiner* — Chantel Graham
(74) *Attorney, Agent, or Firm* — SHOOK, HARDY & BACON L.L.P.

(57) ABSTRACT

Systems and methods are provided for using size-reversing materials in vessels where direct heating is used to at least partially provide heat for reforming reactions under cyclic reforming conditions. An example of a size-reversing material is the combination of NiO and $Al_2O_3$. It has been discovered that size-reversing materials can undergo a phase transition that can assist with re-dispersion of metal at (Continued)

elevated temperatures. This can assist with maintaining catalytic activity for reforming over longer time periods in the presence of cyclic reforming conditions.

16 Claims, 12 Drawing Sheets

(51) Int. Cl.
| | |
|---|---|
| *B01J 35/04* | (2006.01) |
| *B01J 21/04* | (2006.01) |
| *B01J 23/755* | (2006.01) |
| *B01J 38/12* | (2006.01) |
| *B01J 8/00* | (2006.01) |
| *B01J 23/00* | (2006.01) |
| *B01J 23/10* | (2006.01) |
| *B01J 23/46* | (2006.01) |
| *B01J 29/74* | (2006.01) |
| *B01J 35/00* | (2006.01) |
| *B01J 35/10* | (2006.01) |
| *B01J 37/03* | (2006.01) |
| *B01J 37/04* | (2006.01) |
| *B01J 37/08* | (2006.01) |
| *C01B 3/38* | (2006.01) |
| *C01B 3/40* | (2006.01) |

(52) U.S. Cl.
CPC ............. *B01J 23/10* (2013.01); *B01J 23/464* (2013.01); *B01J 23/755* (2013.01); *B01J 29/74* (2013.01); *B01J 35/0006* (2013.01); *B01J 35/04* (2013.01); *B01J 35/1009* (2013.01); *B01J 35/1014* (2013.01); *B01J 37/038* (2013.01); *B01J 37/04* (2013.01); *B01J 37/082* (2013.01); *B01J 38/12* (2013.01); *C01B 3/382* (2013.01); *C01B 3/384* (2013.01); *C01B 3/40* (2013.01); *C10G 11/22* (2013.01); *B01J 2208/00017* (2013.01); *B01J 2208/00548* (2013.01); *C01B 2203/0233* (2013.01); *C01B 2203/0811* (2013.01); *C01B 2203/1058* (2013.01); *C01B 2203/1064* (2013.01); *C10G 2300/70* (2013.01)

(58) Field of Classification Search
CPC ........ B01J 23/002; B01J 23/005; B01J 23/10; B01J 23/464; B01J 23/755; B01J 23/94; B01J 29/106; B01J 29/74; B01J 35/0006; B01J 35/002; B01J 35/04; B01J 35/1009; B01J 35/1014; B01J 37/0215; B01J 37/038; B01J 37/04; B01J 37/08; B01J 37/082; B01J 38/12; B01J 38/14; B01J 8/008; B01J 8/0438; B01J 8/0492; B01J 8/0496; C01B 2203/0233; C01B 2203/0811; C01B 2203/1058; C01B 2203/1064; C01B 2203/1082; C01B 3/382; C01B 3/384; C01B 3/40; C10G 11/04; C10G 11/22; C10G 2300/70; Y02P 20/52; Y02P 20/584

See application file for complete search history.

(56) References Cited

U.S. PATENT DOCUMENTS

| | | | |
|---|---|---|---|
| 4,906,603 A | | 3/1990 | Burgfels et al. |
| 4,990,481 A | | 2/1991 | Sato et al. |
| 7,335,346 B2 | | 2/2008 | Wang et al. |
| 7,815,873 B2 | | 10/2010 | Sankaranarayanan et al. |
| 8,754,276 B2 | | 6/2014 | Buchanan et al. |
| 2002/0177628 A1 | * | 11/2002 | Gaffney ................. B01J 35/04 |
| | | | 502/259 |
| 2004/0054016 A1 | | 3/2004 | Lu et al. |
| 2004/0180786 A1 | | 9/2004 | Zhao et al. |
| 2008/0076661 A1 | * | 3/2008 | Weissman ............... C01B 3/40 |
| | | | 502/104 |
| 2014/0332726 A1 | | 11/2014 | D'souza et al. |
| 2017/0001863 A1 | | 1/2017 | Park et al. |
| 2018/0085740 A1 | | 3/2018 | Pontes Bittencourt |
| 2019/0300364 A1 | | 10/2019 | Weiss et al. |
| 2020/0030778 A1 | | 1/2020 | Ide et al. |

FOREIGN PATENT DOCUMENTS

| | | | | |
|---|---|---|---|---|
| EP | 1222024 B1 | | 7/2004 | |
| KR | 10-2012-0122544 A | | 11/2012 | |
| KR | 20210051179 A | | 5/2021 | |
| WO | 2011/020194 A1 | | 2/2011 | |
| WO | 2015/069621 A2 | | 5/2015 | |
| WO | WO-2017087188 A1 | * | 5/2017 | ............. B01J 23/10 |
| WO | 2022/081415 A2 | | 4/2022 | |
| WO | 2022082119 A2 | | 4/2022 | |

OTHER PUBLICATIONS

Naba, M., et al., "Hydrogen Production by Conversion of Methane Over Nickel-Supported Usy-Type Zeolite Catalysts", Reaction Kinetics and Catalysis Letters, vol. 77, No. 1, pp. 109-115 (2002).
Invitation to pay additional fees received for PCT Patent Application No. PCT/US2021/053978, dated Mar. 14, 2022, 12 pages.
Non-Final Office Action dated Oct. 13, 2022 in U.S. Appl. No. 17/496,592, 11 pages.
Final Office Action dated Feb. 14, 2023 in U.S. Appl. No. 17/496,592, 5 pages.
International Search Report and Written Opinion received for PCT Application No. PCT/US2021/053978, dated Jul. 1, 2022, 31 Pages.
Soloviev, S.O. "Oxidative Reforming of Methane on Structured Ni-Al2O3/Cordierite Catalysts", Catalysis in Industry, vol. 4, No. 1, pp. 1-10 (2012).
Notice of Allowance dated Apr. 21, 2023 in U.S. Appl. No. 17/496,592, 8 pages.
Non-Final Office Action dated Jul. 3, 2023 in U.S. Appl. No. 17/496,592, 10 pages.
Notice of Allowance dated Nov. 8, 2023 in U.S. Appl. No. 17/496,592, 7 pages.

\* cited by examiner

SIZE-REVERSING MATERIALS FOR REFORMING IN CYCLIC FLOW REACTORS

CROSS-REFERENCE TO RELATED APPLICATIONS

This application claims priority to and the benefit of U.S. Provisional Application No. 63/090,880, filed on Oct. 13, 2020, the disclosure of which is incorporated herein by reference in its entirety.

FIELD OF THE INVENTION

This invention relates to size-reversing materials suitable for use in hydrocarbon reforming in high temperature environments.

BACKGROUND OF THE INVENTION

Reverse flow reactors are an example of a reactor type that is beneficial for use in processes with cyclic reaction conditions. For example, due to the endothermic nature of reforming reactions, additional heat needs to be introduced on a consistent basis into the reforming reaction environment. Reverse flow reactors can provide an efficient way to introduce heat into the reaction environment. After a portion of the reaction cycle used for reforming or another endothermic reaction, a second portion of the reaction cycle can be used for combustion or another exothermic reaction to add heat to the reaction environment in preparation for the next reforming step. This allows for direct heating of the surfaces in the reaction environment, thus reducing or minimizing losses due to heat transfer. U.S. Pat. Nos. 7,815,873 and 8,754,276 provide examples of using reverse flow reactors to perform various endothermic processes in a cyclic reaction environment.

Endothermic reactions such as reforming can also benefit from having a substantial amount of available catalytic surface area. Ceramic monolith structures are an example of a type of structure that can provide a high available surface area. One option can be to use a monolith corresponding to a packed array of cells or channels that the reactant gases pass through. Washcoats are added to such monoliths to provide catalytic activity.

U.S. Patent Application Publication 2020/0030778 describes monolith structures for use in hydrocarbon reforming where the monolith structures are composed of a mixture of one or more dopant metal oxides and one or more structural oxides. The dopant metal(s) and structural oxide(s) are selected based on the relative Gibbs free energy values for the dopant metal oxide and the structural oxide. NiO and $Al_2O_3$ are described as an example of a suitable combination of a dopant metal oxide and a structural oxide for forming a monolith structure.

SUMMARY OF THE INVENTION

In an aspect, a method for reforming hydrocarbons is provided. The method includes reacting a mixture including fuel and 0.1 vol % or more of $O_2$ under combustion conditions in a combustion zone within a reactor to heat one or more surfaces in a reaction zone to a regenerated surface temperature of 800° C. or more. The reaction zone can include a catalyst system supported on one or more surfaces of a support structure. The catalyst system can include M and $Al_2O_3$, where M is a metal from Groups 3 to 12 of the Periodic Table. The catalyst system can optionally further include at least one of MO and $MAl_2O_4$. The method further includes exposing the catalyst system to a gas flow to convert at least a portion of the M and $Al_2O_3$ to MO, $MAl_2O_4$, or a combination thereof. The gas flow can contain 100 mol % to 250 mol % of a stoichiometric molar amount of $O_2$ for conversion of a molar amount of M in the catalyst system from metallic M to MO, $MAl_2O_4$, or a combination thereof. The method can further include exposing a reactant stream including a reformable hydrocarbon to the one or more surfaces in the reaction zone to increase the temperature of the reactant stream. Additionally, the method can include exposing the reactant stream to the catalyst system in the reaction zone at a temperature of 800° C. or more to form a product stream containing $H_2$ and to convert at least a portion of the MO, $MAl_2O_4$, or a combination thereof to metallic M.

In another aspect, a method for reforming hydrocarbons in a cyclic reaction environment is provided. The method includes reacting a mixture including fuel and $O_2$ under combustion conditions in a combustion zone within a reactor to heat one or more surfaces in a reaction zone to a regenerated surface temperature of 1000° C. or more. The mixture of fuel and $O_2$ can include 120% or more of a stoichiometric molar amount of $O_2$ for combustion of the fuel. The reaction zone can include a catalyst system supported on one or more surfaces of a support structure. The catalyst system can include i) Ni and $Al_2O_3$, ii) NiO and $Al_2O_3$, iii) $NiAl_2O_4$, or iv) a combination of two or more of i), ii) and iii). The method further includes exposing a reactant stream including a reformable hydrocarbon to the one or more surfaces in the reaction zone to increase the temperature of the reactant stream. Additionally, the method includes exposing the reactant stream to the catalyst system in the reaction zone at a temperature of 1000° C. or more to form a product stream containing $H_2$, a direction of flow for the reactant stream within the reaction zone being reversed relative to a direction of flow for the mixture.

In still another aspect, a method for reforming hydrocarbons is provided. The method includes reacting a mixture including fuel and 0.1 vol % or more of $O_2$ under combustion conditions in a combustion zone within a reactor to heat one or more surfaces in a reaction zone to a regenerated surface temperature of 1000° C. or more. The reaction zone can include a catalyst system supported on one or more surfaces of a support structure. The catalyst system can include i) Ni and $Al_2O_3$, ii) NiO and $Al_2O_3$, iii) $NiAl_2O_4$, or iv) a combination of two or more of i), ii) and iii). The method further includes exposing the catalyst system to a gas flow including 100 mol % to 250 mol % of a stoichiometric molar amount of $O_2$ for conversion of the molar amount of Ni in the catalyst system from metallic Ni to NiO, $NiAl_2O_4$, or a combination thereof. The method further includes exposing a reactant stream including a reformable hydrocarbon to the one or more surfaces in the reaction zone to increase the temperature of the reactant stream. Additionally, the method includes exposing the reactant stream to the catalyst system in the reaction zone at a temperature of 1000° C. or more to form a product stream containing $H_2$.

DETAILED DESCRIPTION OF THE EMBODIMENTS

Figure 1:
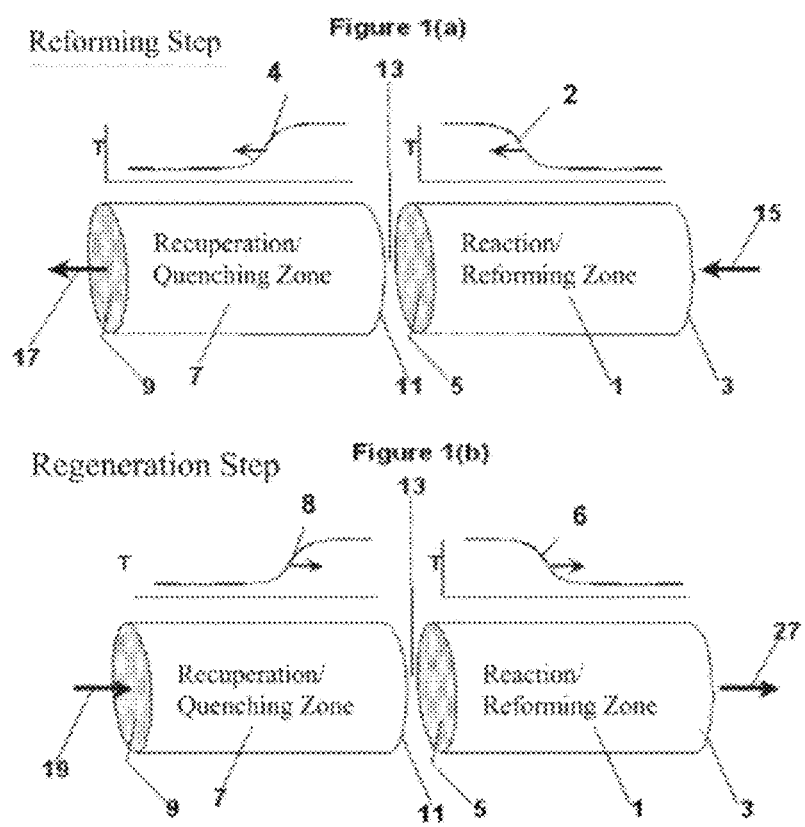
FIG. 1 shows an example of operation of a reverse flow reactor.

All numerical values within the detailed description and the claims herein are modified by "about" or "approximately" the indicated value, and take into account experimental error and variations that would be expected by a person having ordinary skill in the art.

Overview

In various aspects, systems and methods are provided for using size-reversing materials in vessels where direct heating is used to at least partially provide heat for reforming reactions under cyclic reforming conditions. An example of a size-reversing material is the combination of NiO and Al$_2$O$_3$. It has been discovered that the phase transition between NiO and NiAl$_2$O$_4$ can assist with re-dispersion of Ni on a surface. This can assist with maintaining catalytic activity for reforming over longer time periods in the presence of cyclic reforming conditions.

Reforming of hydrocarbons to form synthesis gas is a potentially desirable pathway for reducing or minimizing CO$_2$ emissions associated with hydrocarbon fuels. Reforming can convert hydrocarbon fuels into H$_2$, a fuel with no CO$_2$ emissions, and CO or CO$_2$. By separating the H$_2$ from the carbon oxides in a single location, some of the difficulties associated with preventing CO$_2$ emissions can be reduced or minimized. However, due to the elevated temperatures required for hydrocarbon reforming, balancing efficient reforming of hydrocarbons with energy consumption and operating lifetime for equipment remains a challenge.

Reverse flow reactors are an example of a type of reactor that can provide heat to a reforming reaction environment by direct heating of the surfaces in the reaction environment. This is achieved using cyclic reforming conditions, where at least a first portion of a cycle involves performing reforming in the reaction environment (an endothermic process), and at least a second portion of the cycle involves direct heating of one or more surfaces within the reaction environment (to provide the heat for the endothermic process). This can reduce or minimize heat loss while attempting to add heat to the reaction zone. Optionally, use of flows in opposing directions can provide further benefits with regard to developing a desirable temperature profile within the reaction zone. Reverse flow reactors will be used herein as an example of this type of system, but it is understood that reverse flow reactors are an example of a reactor that can provide such benefits.

Due to the nature of direct heating under cyclic reforming conditions, portions of the reaction environment can be exposed to peak temperatures that are well above the minimum temperatures necessary for performing a reforming reaction. For example, portions of the reaction environment can encounter temperatures of 1000° C. or higher, or 1100° C. or higher, or 1200° C. or higher (such as up to 1600° C. or possibly still higher).

During the reforming portion of a cyclic reaction scheme for reforming, H$_2$ is formed by the reforming reaction. Due to the reducing nature of an environment containing a substantial amount of H$_2$ under reforming conditions, this can cause a substantial portion of the catalytic metals present on exposed surfaces in the reaction environment to be converted from an oxide form to a metallic form. After reforming, the direct heating step can correspond to an oxidizing environment, and a portion of the metals that are in metallic form can be converted back into metal oxides.

Unfortunately, the elevated temperatures present in cyclic reforming environment can result in "sintering" of the catalytic metals present on surfaces in the reaction environment. When metals are present in a metallic state at elevated temperatures, the metals can have an increased tendency to coalesce or "sinter" on a surface, resulting in formation of larger metal particles. As a result, this sintering can reduce the available surface area of catalytic metal, as the larger particles of metal have lower ratio of surface area to volume. Over time, this can reduce or minimize the catalytic activity within the reaction environment.

It has been discovered that the loss of catalytic activity due to sintering can be reduced or minimized by using a "size-reversing" material in at least a portion of the reaction environment, in combination with modifying at least a portion of the conditions used during the cyclic reforming process. In various aspects, Ni can be used as the catalytic metal (NiO in oxidized form) in at least a portion of the reaction environment, such as a portion of the reaction environment that is exposed to temperatures of 1000° C. or more, or 1100° C. or more, or 1200° C. or more, or 1300° C. or more, such as up to 1600° C. or possibly still higher. The Ni can be provided as part of a catalyst system, such as a system including both NiO and Al$_2$O$_3$. It has been discovered that NiO and Al$_2$O$_3$ can undergo a transition to a spinel phase corresponding to NiAl$_2$O$_4$. When NiO and Al$_2$O$_3$ are converted to NiAl$_2$O$_4$, it has also been discovered that this phase transition facilitates re-dispersion of the Ni at a surface.

It has further been discovered that the size-reversing properties of the NiO+Al$_2$O$_3$/NiAl$_2$O$_4$ system can be used to at least partially reverse the effects of sintering, so that the net formation of larger Ni (or NiO) particles is reduced or minimized. In order to achieve cyclic reforming can be performed under modified cyclic reforming conditions. In some aspects, one type of modification can correspond to a modification to increase the amount of metal that is converted from a metallic state to an oxide state during one or more portions of a cyclic reforming process. It has been discovered that the combustion (heating) step used for conventional cyclic reforming conditions can provide a reaction environment that does not contain sufficient $O_2$ to allow for substantial conversion of Ni to NiO. By providing additional $O_2$ under oxidizing conditions during at least a portion of the cyclic reforming reaction cycle, a higher percentage of metallic Ni can be converted back to NiO. This increase in the amount of available NiO can thus allow for an increased amount of the transition from NiO+$Al_2O_3$ to the spinel phase composition $NiAl_2O_4$.

Additionally or alternately, the temperature profile and/or timing during one or more portions of a cyclic reforming process can be modified to provide a sufficient combination of time and temperature to allow for the phase transition to occur from NiO+$Al_2O_3$ to $NiAl_2O_4$. It has been discovered that the phase transition from NiO+$Al_2O_3$ to $NiAl_2O_4$ is slow relative to conversion of a nickel oxide (either NiO or $NiAl_2O_4$) to metallic Ni. It has further been discovered that elevated temperatures and/or longer times at elevated temperatures can assist with increasing the amount of $NiAl_2O_4$ that is formed.

It is noted that other combinations of oxides are known to undergo a phase transition to form a spinel phase (i.e., the reversible reaction corresponding to <oxide A>+<oxide B>=<spinel oxide AB>). However, such known systems correspond to phase transitions that readily occur at temperatures substantially below 1000° C. It is unexpected that a) the phase transition to form the $NiAl_2O_4$ phase requires temperatures above 1000° C. to occur at a reasonable rate, and that b) by enabling such a phase transition, sintering of the Ni metal can be at least partially reversed.

It is further noted that by increasing the amount of oxygen available during the combustion (heating) step of a reforming reaction cycle, other catalytic metals can also take advantage of formation of a combined phase with alumina (such as a spinel phase) to achieve side-reducing behavior. For example, other metals from Groups 3 to 12 that preferentially form oxides with the stoichiometry "MO" (i.e., metal in a +2 oxidation state) at temperatures of 800° C. or higher, or 1000° C. or higher, such as up to 1600° C. or possibly still higher, can potentially correspond to size-reversing materials. To correspond to size-reversing materials, such metals can also be reduced from an oxide phase corresponding to MO or $MAl_2O_4$ to metallic M at temperatures of 800° C. or higher, or 1000° C. or higher, such as up to 1600° C. or possibly still higher. As an example, iron (M=Fe) can form FeO as a thermodynamically stable phase at temperatures of 1000° C. or higher, and reduction of FeO to Fe can also occur in the presence of $H_2$ at temperature of 1000° C. or higher. Thus, other metals "M" from Groups 3 to 12 of the Periodic Table that both form MO (under oxidation conditions at 800° C. or higher, or 1000° C. or higher) and metallic M (under reducing conditions at 800° C. or higher, or 1000° C. or higher) can also be used while taking advantage of size-reducing behavior to reduce or minimize sintering.

Metal Reduction and Oxidation in Cyclic Reforming Environment

In a cyclic reforming environment, catalytic metals can be exposed to both reducing conditions and oxidation conditions. In a conventional cyclic reaction cycle for reforming, however, the amount of metal that can be reduced during the reducing portion(s) of the cycle can be substantially greater than the amount of metal that can be oxidized during the oxidizing portion(s) of the cycle.

During a reaction cycle for performing reforming, at least a portion of the cycle can correspond to a reforming step. The reforming step can be any convenient type of hydrocarbon reforming, such as reforming based on steam reforming, dry reforming, or a combination thereof. During reforming, a hydrocarbon such as methane is converted into $H_2$, CO, and/or $CO_2$. Due to the generally reducing environment and amount of $H_2$ generated, the $H_2$ present in the reaction environment during the reforming step typically represents a substantial excess relative to the amount of $H_2$ that would be needed for complete conversion of exposed catalytic metal from the oxide state (such as NiO or $NiAl_2O_4$) to the metallic state (such as Ni). As a result, the conditions during a reforming step can be suitable for conversion of a substantial amount of the catalytic metal from an oxide state to a metallic state.

A reaction cycle for performing reforming that includes direct heating can also include at least one combustion step, where a fuel is combusted to provide heat for the endothermic reforming reaction. Conventionally, the oxygen content for this step can be selected to provide a stoichiometric excess relative to the amount needed for complete combustion of the fuel. Conventionally, addition of a greater amount of gas (such as additional oxygen) has been viewed as undesirable. Cyclic reforming conditions typically involve large flow volumes and high superficial gas velocities. Thus, any additional gas added during a step further increases represents a diluent that can increase the amount of heat that is lost from the process without being transferred to the surfaces of the reaction environment. As a result, under conventional conditions, the excess oxygen present during combustion can correspond to less than 15 mol % of the oxygen that would be needed for complete oxidation of catalyst in a metallic state to catalyst in an oxide state.

Based on the above, after only a few cycles of reforming, the catalyst in the reaction zone can primarily be in a reduced (metallic) state, with only a small portion of the catalyst being converted between a metallic state to an oxidized state and then back to metallic during each cycle. In this type of situation, sintering can occur more quickly, as the metal is in a metallic state for a substantial portion of the time during each cycle, including during the combustion portions of the cycle where temperatures are the highest.

The above difficulties with a conventional cyclic reforming reaction scheme can be overcome in various manners. One modification can be to increase the amount of available oxygen when the catalytic metal is exposed to oxidizing conditions. For example, instead of selecting the amount of oxygen ($O_2$) during the combustion step based on the stoichiometric need for combusting all of the fuel, the amount of oxygen introduced during the combustion step can be selected based on the combined stoichiometric need for combusting all fuel and converting all catalytic metal in a selected portion of a reactor from a metallic state to an oxide state. As another example, the amount of excess oxygen relative to the stoichiometric need for combustion of all fuel can be increased.

In this discussion, 100 mol % of the molar stoichiometric oxygen amount is defined as the stoichiometric amount of oxygen that is needed to combust all fuel introduced during the regeneration step. Amounts of oxygen greater than 100 mol % of the molar stoichiometric oxygen amount correspond to excess oxygen. For example, 120 mol % of the molar stoichiometric oxygen amount corresponds using a number of moles of oxygen that is 20 mol % greater than the number of moles needed for stoichiometric combustion. This can be referred to an excess molar oxygen amount of 20 mol %. In various aspects, the amount of oxygen used during regeneration can correspond to 120 mol % or more of the molar stoichiometric amounts, or 125 mol % or more, or 130 mol % or more, or 140 mol % or more, or 170 mol % or more, or 200 mol % or more, such as up to 400 mol % or possibly still higher. Additionally or alternately, in some aspects the amount of oxygen during combustion can correspond to 100 mol % or more of the combined stoichiometric need for both combustion of fuel and conversion of catalytic metal to metal oxide in a selected region, or 110 mol % or more, or 120 mol % or more, such as up to 200 mol % or possibly still higher.

High Temperature Reforming Catalyst System—$NiAl_2O_4$ and $NiO/NiAl_2O_4$

In some aspects, a catalyst system can correspond to a mixture of NiO and $Al_2O_3$. Under the cyclic high temperature reforming conditions, the NiO and the $Al_2O_3$ in the will react to form a mixed phase of NiO, $NiAl_2O_4$, and/or $Al_2O_3$. Additionally, based on cyclic exposure to oxidizing and reducing conditions, the catalyst can be converted from a substantially fully oxidized state, such as a combination of oxides including NiO, $NiAl_2O_4$ and $Al_2O_3$, to various states including at least some Ni metal supported on a surface. In this discussion, a catalyst system that includes both NiO and $Al_2O_3$ can be referred to as an $NiAl_2O_4$ catalyst system.

Based on the stoichiometry for combining NiO and $Al_2O_3$ to form $NiAl_2O_4$, a catalyst including a molar ratio of Al to Ni of roughly 2.0 (i.e., a ratio of 2:1) could result in formation of $NiAl_2O_4$ with no remaining excess of NiO or $Al_2O_3$. Thus, one option for forming an $NiAl_2O_4$ catalyst is to combine NiO and $Al_2O_3$ to provide a stoichiometric molar ratio of Al to Ni of roughly 2.0. In some other aspects, an excess of NiO can be included in the catalyst relative to the amount of alumina in the support, so that at least some NiO is present in a fully oxidized state. In such aspects, the molar ratio of Al to Ni in the catalyst can be less than 2.0. For example, the molar ratio of Al to Ni in a $NiO/NiAl_2O_4$ catalyst can be 0.1 to 2.0, or 0.1 to 1.9, or 0.1 to 1.5, or 0.5 to 2.0, or 0.5 to 1.9, or 0.5 to 1.5, or 1.0 to 2.0, or 1.0 to 1.9, or 1.2 to 1.5, or 1.5 to 2.0, or 1.5 to 1.9. In still other aspects, an excess of $Al_2O_3$ can be included in the catalyst relative to the amount of Ni, so that at least some $Al_2O_3$ is present in a fully oxidized state. In such aspects, the molar ratio of Al to Ni in the catalyst can be greater than 2.0. For example, the molar ratio of Al to Ni in a $NiAl_2O_4/Al_2O_3$ catalyst can be 2.0 to 10, or 2.1 to 10, or 2.0 to 5.0, or 2.1 to 5.0, or 2.0 to 4.0, or 2.1 to 4.0.

In various aspects, an $NiAl_2O_4$ catalyst can be incorporated, for example, into a washcoat that is then applied to a surface or structure within a reactor, such as a monolith. By providing NiO and $Al_2O_3$ as a catalyst system that is then deposited on a separate monolith (which can then form $NiAl_2O_4$ under the cyclic conditions), the activity of the catalyst can be maintained for unexpectedly longer times relative to using a monolith that directly incorporates NiO and $Al_2O_3$ into the monolith structure.

When a composition is formed that includes both nickel oxide and alumina, the NiO and $Al_2O_3$ can react to form a compound corresponding to $NiAl_2O_4$. However, when NiO (optionally in the form of $NiAl_2O_4$) is exposed to reducing conditions, the divalent Ni can be reduced to form metallic Ni. Thus, under cyclic reforming conditions that include both high temperature oxidizing and reforming environments, at least a portion of $NiAl_2O_4$ catalyst can undergo cyclic transitions between states corresponding to Ni metal and $Al_2O_3$ and $NiAl_2O_4$. It is believed that this cyclic transition between states can allow an $NiAl_2O_4$ catalyst to provide unexpectedly improved activity over extended periods of time. Without being bound by any particular theory, it is believed that at least part of this improved activity for extended time periods is due to the ability of Ni to "re-disperse" during the successive oxidation cycles. It is believed this re-dispersion occurs in part due to the formation of $NiAl_2O_4$ from NiO and $Al_2O_3$. Catalyst sintering is a phenomenon known for many types of catalysts where exposure to reducing conditions at elevated temperature can cause catalyst to agglomerate on a surface. Thus, even if the surface area of the underlying surface remains high, the agglomeration of the catalyst may reduce the amount of available catalyst active sites, as the catalyst sinters and forms lower surface area deposits on the underlying surface. By contrast, it is believed that the cyclic transition between states can allow the Ni in an $NiAl_2O_4$ catalyst system to retain good dispersion, so that catalyst activity can be maintained. It is believed that further advantage can be obtained by using a sufficient amount of excess oxygen during the regeneration step so that all available Ni is oxidized back to NiO and/or $NiAl_2O_4$.

It is noted that by supplying both NiO as a catalyst and $Al_2O_3$ as a metal oxide support layer as part of the catalyst system, the alumina for forming $NiAl_2O_4$ is already provided as part of the catalyst system. It is believed that this reduces or minimizes interaction of Ni with any alumina that may be present in the monolith composition, and therefore reduces or minimizes degradation of the underlying monolith when exposed to successive cycles of high temperature oxidation and reduction.

Although $NiAl_2O_4$ could potentially be used as a structural material for forming a monolith, it has been unexpectedly found that using $NiAl_2O_4$ as a washcoat for a separate structure (such as a monolith) can allow catalytic activity to be maintained for substantially longer time periods. It is noted that U.S. Patent Application Publication 2020/0030778 describes using a monolith composed of a combination of NiO and $Al_2O_3$ as a structure to provide reforming catalytic activity under cyclic high temperature reforming conditions. However, it is believed that the cyclic transition of states for a monolith composed at least partially of $NiAl_2O_4$ can contribute to structural breakdown of the monolith. Because a monolith structure typically includes a large number of cells or passages per unit area, the structural breakdown of the monolith can result in filling or even collapse of the cells, so that the available surface area that the reactant gas flows are exposed to in the reforming environment is greatly reduced.

In some aspects, $NiAl_2O_4$ can be used as a catalyst system when a single catalyst zone is used in a reforming reactor. In some aspects where multiple catalyst zones are present, $NiAl_2O_4$ can be used as a catalyst system in the highest temperature zone, in an intermediate temperature zone, or a combination thereof.

Reforming Catalyst and Metal Oxide Support Layer—General

In various aspects, one option for adding a reforming catalyst to a monolith can be to coat the monolith with a mixture of a catalyst (optionally in oxide form) and metal oxide support layer. For example, powders of the catalyst oxide and the metal oxide support layer can be used to form a washcoat that is then applied to the monolith (or other structure). This can result in a catalyst system where the catalyst is mixed within/distributed throughout the metal oxide support layer, as opposed to the catalyst being deposited on top of the metal oxide support layer. In other words, at least a portion of the catalyst system can correspond to a mixture of the catalyst and the support layer. In other aspects, any convenient method for depositing or otherwise coating the catalyst system on the monolith or other structure can be used. The weight of the catalyst system on the monolith (or other structure) can correspond to 0.1 wt % to 10 wt % of the total weight of the catalyst system plus monolith, or 0.5 wt % to 10 wt %, or 2.0 wt % to 10 wt %, or 0.1 wt % to 6.0 wt %, or 0.5 wt % to 6.0 wt %, or 2.0 wt % to 6.0 wt %.

In some aspects, the catalyst system can include a thermally stable metal oxide support layer. A thermally stable metal oxide support layer corresponds to a metal oxide that is thermally phase stable with regard to structural phase changes at temperatures between 800° C. to 1600° C. In some aspects, such a thermally stable metal oxide support layer can be formed by coating a surface (such using a washcoat) with a metal oxide powder that has a surface area of 20 m²/g or less. For example, the metal oxide powder used for forming a thermally stable metal oxide coating can have a surface area of 0.5 m²/g to 20 m²/g, or 1.0 m²/g to 20 m²/g, or 5.0 m²/g to 20 m²/g. High temperature reforming refers to reforming that takes place at a reforming temperature of 1000° C. or more, or 1100° C. or more, or 1200° C. or more, such as up to 1500° C. or possibly still higher. In various aspects, a catalyst can be annealed at a temperature of 1000° C. or more, or 1100° C. or more, or 1200° C. or more, or 1300° C. or more, such as up to 1600° C. or possibly still higher. This temperature can be substantially similar to or greater than the peak temperature the catalyst is exposed to during a reforming process cycle. An annealing temperature that is substantially similar to a peak temperature can correspond to an annealing temperature that differs from the peak temperature by 0° C. to 50° C.

As an example of a thermally stable metal oxide support layer, alumina has a variety of phases, including $\alpha$-$Al_2O_3$, $\gamma$-$Al_2O_3$, and $\theta$-$Al_2O_3$. A metal powder of $\alpha$-$Al_2O_3$ can typically have a surface area of 20 m²/g or less. By contrast, the $\gamma$-$Al_2O_3$ and $\theta$-$Al_2O_3$ phases have higher surface areas, and a metal powder for use in a washcoat solution of $\gamma$-$Al_2O_3$ and/or $\theta$-$Al_2O_3$ will have a surface area of greater than 20 m²/g. It is conventionally believed that phases such as $\theta$-alumina or $\gamma$-alumina are superior as a supporting structure for a deposited catalyst, as the greater surface per gram of $\theta$-alumina or $\gamma$-alumina will allow for availability of more catalyst active sites than $\alpha$-alumina. However, phases such as $\gamma$-$Al_2O_3$ and $\theta$-$Al_2O_3$ are not thermally phase stable at temperatures of 800° C. to 1600° C. At such high temperatures, phases such as $\gamma$-$Al_2O_3$ and $\theta$-$Al_2O_3$ will undergo phase transitions to higher stability phases. For example, at elevated temperatures, $\gamma$-$Al_2O_3$ will first convert to $\Delta$-$Al_2O_3$ at roughly 750° C.; then $\Delta$-$Al_2O_3$ will convert to $\theta$-$Al_2O_3$ at roughly 950° C.; then $\theta$-$Al_2O_3$ will then convert to $\alpha$-$Al_2O_3$ with further exposure to elevated temperatures between 1000° C. and 1100° C. Thus, $\alpha$-$Al_2O_3$ is the thermally phase stable version of $Al_2O_3$ at temperatures of 800° C. to 1600° C.

Without being bound by any particular theory, it is believed that such phase changes during exposure to elevated temperature can contribute to degradation of the catalyst and/or the structure supporting the catalyst. By contrast, by using a support that is phase stable at an elevated annealing temperature and then annealing the catalyst (including support) at the elevated annealing temperature, the resulting catalyst can substantially maintain an initial catalytic activity level for an extended period of time. It is noted that the initial catalytic activity achieved by depositing catalyst on a monolith formed from a phase stable, low surface area per gram material may be lower than depositing catalyst on a similar monolith formed from a material having a higher surface area per gram. However, it has been discovered this initial activity advantage for the higher surface area material is quickly lost during exposure to cyclic high temperature reforming conditions.

As a further illustration, without being bound by any particular theory, $\gamma$-$Al_2O_3$ is a transitional alumina that may be viewed as a defect oxyhydroxide, with a spinel related crystalline structure. In prior academic work, $\gamma$-$Al_2O_3$ has been formulated an alumina spinel, with defect sites having a formula of $Al_{8/3}\square_{1/3}O_4$, where $\square$ symbolizes open cation sites. Including the hydroxyls, it may be viewed as $Al_{2.5}\square_{0.5}O_{3.5}(OH)_{0.5}$. Such $\gamma$-$Al_2O_3$ is thermally unstable with respect to $\alpha$-$Al_2O_3$. Although $\theta$-$Al_2O_3$ is more crystalline and has less surface area and hydroxide content compared to $\gamma$-$Al_2O_3$, $\theta$-$Al_2O_3$ also includes defect sites (i.e., open cation sites, and is also thermally unstable relative to $\alpha$-$Al_2O_3$. Thus, $\gamma$- and $\theta$-$Al_2O_3$ both have defect sites ($\square$) capable of reacting with multivalent cations (or metal oxides). Both Rh(O) and Ni(O) may react to produce denser phases, where Rh and Ni may not be as chemically accessible for catalytic reaction as compared to their oxide or metallic states. Even in the absence of reactions with Rh or Ni, $\gamma$- and $\theta$-$Al_2O_3$ are thermodynamically unstable with respect to $\alpha$-$Al_2O_3$ under high temperature conditions.

It has been discovered that using a thermally stable metal oxide in a catalyst system, in combination with annealing of the catalyst system on the monolith at high temperature, can provide unexpected activity benefits and structural stability benefits over extended periods of time. Without being bound by any particular theory, when a catalyst system including a non-thermally stable metal oxide is used in a coating for a monolith, exposing such a catalyst system to a cyclic high temperature reforming environment can result in structural degradation of the catalyst system. It is believed that this structural degradation of a catalyst system can contribute to a reduction in available catalyst sites, possibly due to the catalyst becoming buried within a degraded structure and/or additional sintering or agglomeration of the catalyst as the non-thermally stable metal oxide in the catalyst system converts to a lower surface area phase. This structural degradation can be observed, for example, by examining the catalyst system on a monolith after exposure to a cyclic high temperature reaction environment. For a conventional catalyst system, after exposure to a cyclic high temperature reaction environment, the catalyst system can be readily scraped off of the underlying structure. Additionally, a substantial reduction in activity can be observed.

By contrast, when a catalyst system is used that includes a thermally stable metal oxide, the activity of the catalyst in the catalyst system can be unexpectedly maintained for extended run lengths with little or no loss of activity. Additionally, after exposure to a cyclic high temperature reforming environment, the catalyst system can unexpectedly remain strongly adhered or coated on the underlying monolith or other structure. It is noted that the initial catalyst activity may be lower than for a conventional system, since thermally stable metal oxides typically have a relatively low surface area. This is believed to initially reduce the number of available catalytic sites. However, because the thermally stable metal oxide does not undergo phase transitions when exposed to heat, the catalytic activity of a catalyst system including a thermally stable metal oxide can be maintained. Due to the rapid deactivation for a conventional catalyst or catalyst system, the activity of a conventional catalyst system can rapidly fall below the activity of a catalyst system using a thermally stable metal oxide.

Additionally, further improvements can be achieved by annealing the catalyst system and the underlying monolith (or other supporting structure) at temperatures that are substantially the same as or greater than the peak temperatures the supporting structure is exposed to during the reforming process.

One of the distinctions between using a catalyst system including a thermally stable metal oxide and a catalyst system that does not use a thermally stable oxide is that the catalyst system including the thermal stable metal oxide can have improved adhesion to the underlying support structure after exposure to the cyclic high temperature reforming environment.

Adhesion of the washcoat after operation can be quantified by the amount of force needed to de-adhere the washcoat. In prior operation, washcoats comprised of theta and gamma alumina were de-adhered with minimal force, such as an amount of force similar to a paint brush stroke (weak). In operation with the phase stable supports, the force needed to de-adhere the washcoat was high, similar to the scraping of dried epoxy off of a glass surface (strong). Due to these differences, only small amounts of washcoat could be de-adhered from the phase stable materials, whereas large amounts of washcoat could be de-adhered from the gamma and theta supports.

Other methods for evaluating adhesion of the washcoat include, but are not limited to, (i) a thermal cycling method, (ii) a mechanical attrition method, and (iii) an air-knife method. As a non-limiting example, the thermal cycling method can be performed by heating the washcoated materials to high temperatures in the range of 800 to 1300° C., cooling the heated substrates to ambient temperature, and repeating such a cycle at least five times. As another non-limiting example, the mechanical attrition method can be performed by placing the washcoated materials inside a plastic container and shaking the container on a vibration table for at least 30 minutes.

Adhesion of the washcoated materials can be determined based on exposing a washcoated structure to thermal cycling conditions and then measuring the de-adhered material before and after mechanical attrition testing by mass change. Prior to thermal cycling, the weight of the washcoat on the support structure can be determined. The washcoated structure can then be exposed to thermal cycling conditions. The thermal cycling conditions can correspond to the thermal cycling method above, or the washcoated structure can be exposed to cyclic high temperature reforming conditions for at least five reaction cycles. A catalyst system including a thermally phase stable support can provide good adhesion after mechanical attrition testing, corresponding to retaining 80 wt % or more of the initial washcoat, or retaining 90 wt % or more of the initial washcoat, or 95 wt % or more of the initial washcoat. By contrast, a catalyst system not including a thermally phase stable support that is exposed to cyclic high temperature conditions and then exposed to mechanical attrition testing can retain 75 wt % or less of the initial washcoat.

A catalyst system can be applied to a monolith or other structure, for example, by applying the catalyst system as a washcoat suspension. To form a washcoat suspension, the catalyst system can be added to water to form an aqueous suspension having 10 wt % to 50 wt % solids. For example, the aqueous suspension can include 10 wt % to 50 wt % solids, or 15 wt % to 40 wt %, or 10 wt % to 30 wt %. Optionally, an acid or a base can be added to the aqueous suspension to reduce or raise, respectively, the pH so as to change the particle size distribution of the alumina catalyst and/or binder particles. For example, acetic acid or another organic acid can be added to achieve a pH of 3 to 4. The suspension can then be ball milled (or processed in another manner) to achieve a desired particle size for the catalyst particles, such as a particle size of 0.5 μm to 5 μm. After milling, the suspension can be stirred until time for use so that the particles are distributed substantially uniformly in the solution.

The washcoat suspension can then be applied to a monolith structure to achieve a desired amount of catalyst (such as nickel or rhodium) on the monolith surface. As an example, in one aspect a washcoat thickness of 10 microns was achieved by forming a washcoat corresponding to 10 wt % of the monolith structure. Any convenient type of monolith structure can be used to provide a substantial surface area for support of the catalyst particles. The washcoat can be applied to the monolith to form cells having inner surfaces coated with the catalyst. One option for applying the washcoat can be to dip or otherwise submerge the monolith in the washcoat suspension.

After clearing the cell channels of excess washcoat, the catalyst system coated on the monolith can be optionally dried. Drying can correspond to heating at 100° C. to 200° C. for 0.5 hours to 24 hours. After any optional drying, calcination can be performed. In some aspects, calcining can correspond to heating at 200° C. to 800° C. for 0.5 hours to 24 hours.

In other aspects, a high temperature calcination step can be used, so that the calcining temperature for the catalyst system coated on the monolith is substantially similar to or greater than the peak temperature the monolith will be exposed to during the cyclic high temperature reforming reaction. For a monolith in a high temperature zone, this can correspond to calcining the catalyst system coated on the monolith at a temperature of 800° C. or more, or 1000° C. or more, or 1200° C. or more, or 1300° C. or more, such as up to 1600° C. or possibly still higher. It is noted that if multiple catalyst zones are present, the calcination for monoliths in different catalyst zones can be different.

It has been unexpectedly discovered that performing calcination at a temperature similar to or greater than the peak temperature during the cyclic high temperature reforming process can unexpectedly allow for improved activity for the catalyst system and/or adhesion of the catalyst system to the underlying monolith. Without being bound by any particular theory, it is believed that exposing the monolith and deposited catalyst system to elevated temperatures prior to exposure of the catalyst to a cyclic reaction environment can facilitate forming a stable interface between the catalyst system and the monolith. This stable interface can then have improved resistance to the high temperature oxidizing and/or reducing environment during the reforming process, resulting in improved stability for maintaining the catalyst system on the surface of the monolith.

In various aspects, suitable catalytic metals can include, but are not limited to, Ni, Co, Fe, Pd, Rh, Ru, Pt, Ir, Cu, Ag, Au, Zr, Cr, Ti, V, Mo, Nb, and combinations thereof. The catalytic metal can be selected based on the desired type of catalytic activity. Such catalytic metals may be used in a catalyst in the form of a metal oxide. In some aspects, for reforming of hydrocarbons in the presence of $H_2O$ and/or $CO_2$ to make hydrogen, Ni, Rh, Ru, Pd, Pt, Ir, Cu, Co, or a combination of thereof can be suitable catalytic metals. The weight of catalytic metal oxide in the catalyst system can range from 0.1 wt % to 70 wt %, or 1.0 wt % to 60 wt %, or 2.0 wt % to 50 wt %, relative to the total weight of the catalyst system. In some aspects where the catalytic metal corresponds to a precious metal or noble metal, the weight of catalytic metal oxide in the catalyst system can range from 0.1 wt % to 10 wt %, or 0.2 wt % to 7.0 wt %, or 0.5 wt % to 4 wt %. In some aspects, Ni or other metals capable of forming a metal oxide where the metal is in the +2 oxidation state at temperatures of 800° C. or higher (or 1000° C. or higher), and where the metal oxide is able to be reduced by hydrogen to form the metallic state at temperatures of 800° C. or higher (or 1000° C. or higher), can be used as a catalytic metal.

The catalytic metals can be selected to provide long term stable performance at specific temperature zones of the catalytic bed. This can allow for steady methane conversion, phase stability with the metal oxide support, and reduced or minimized sintering of catalytic metals. As an example involving three catalyst zones, the catalyst system in a highest temperature catalytic zone (e.g. 800~1250° C.), which is exposed to some of highest temperatures and most severe temperature swings, can be composed of Ni as a catalytic metal (NiO as a catalytic metal oxide) and $Al_2O_3$ as a metal oxide support. It is noted that this catalyst system can at least partially convert to $NiAl_2O_4$ during portions of the cyclic reforming process. This catalyst system can be formed, for example, by using a mixture of NiO and $Al_2O_3$, as a washcoat on $\alpha$-$Al_2O_3$ monoliths. In such an example, a catalyst system in a medium temperature catalytic zone (e.g. 600~1150° C.) can be composed of Ni and Rh as catalytic metals (NiO and $Rh_2O_3$ as catalytic metal oxide), and $Al_2O_3$ as a metal oxide support. To form this catalyst system, a mixture of NiO and $Rh_2O_3$, as the catalytic material and $Al_2O_3$ (optionally but preferably $\alpha$-$Al_2O_3$) as a metal oxide support material can be washcoated on a monolith comprising of 95 wt % $\alpha$-$Al_2O_3$, 4 wt % $SiO_2$ and 1 wt % $TiO_2$. In such an example, a catalyst system in a low temperature catalytic zone (e.g. 400~1050° C.) can be composed of Rh as catalytic metal ($Rh_2O_3$ as catalytic metal oxide) and $\alpha$-$Al_2O_3$ as a metal oxide support. To form this catalyst system, a mixture of $Rh_2O_3$ and $\alpha$-$Al_2O_3$ as the catalytic material can be washcoated on a monolith comprising 93 wt % $\alpha$-$Al_2O_3$, 5 wt % $SiO_2$ and 2 wt % MgO.

In various aspects, suitable metals for the metal oxide support layer in the catalyst system can include, but are not limited to, Al, Si, Mg, Ca, Sr, Ba, K, Na, Ti, Zr, Hf, V, Nb, Ta, Cr, Mo, W, Mn, Fe, Ni, Co, Y, La, Ce, and combinations thereof. The metal (or metals) for the metal oxide support can be selected so that the metal oxide support substantially does not convert to metallic form under the reducing conditions present in the cyclic reaction environment. As an example, when the catalytic metal oxide is NiO, one option for a metal oxide support is $Al_2O_3$, preferably $\alpha$-$Al_2O_3$. Another example of a suitable metal oxide support, optionally, in combination with NiO as the catalytic metal oxide, is a mixture of $Al_2O_3$ with $SiO_2$, MgO and/or $TiO_2$. In such an example, $SiO_2$ can combine with $Al_2O_3$ to form a mullite phase that could increase resistance to thermal shock and/or mechanical failure. Additionally or alternately, in such an example, MgO and/or $TiO_2$ can be added. The weight of metal oxide support in the catalyst bed can range from 1.0 wt % to 40 wt %, or 2.0 wt % to 30 wt %, or 3.0 wt % to 20 wt %, relative to the total weight of the monolith in the catalyst bed.

Figure 3:
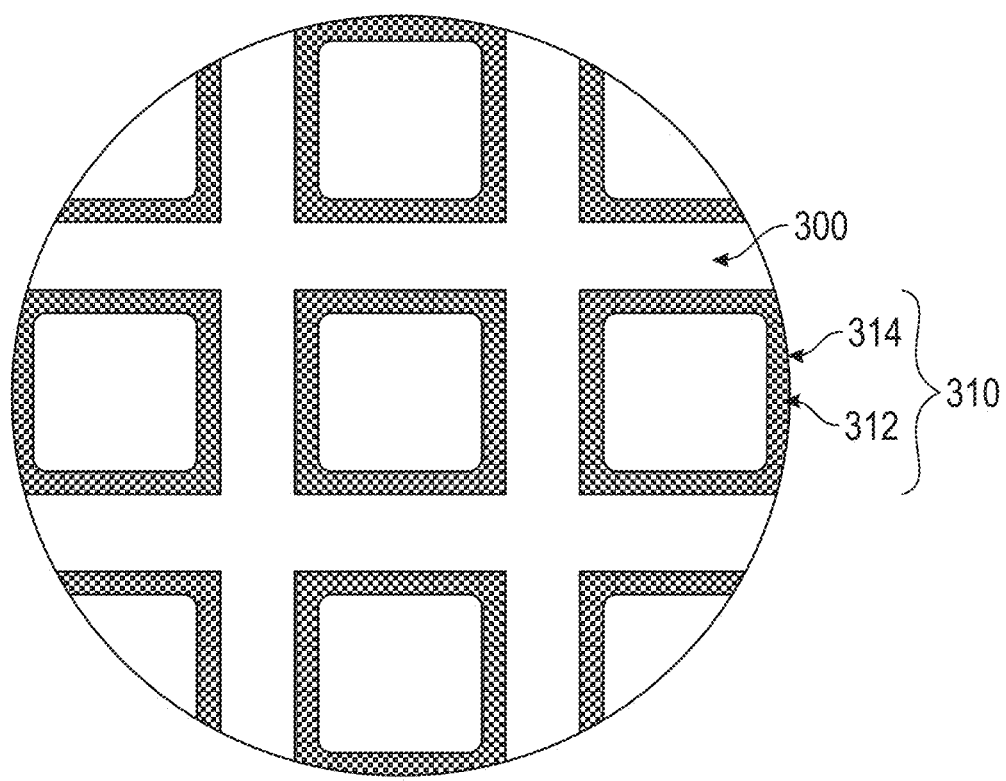
FIG. 3 shows an example of a catalyst system deposited on surfaces of a honeycomb monolith.

FIG. 3 shows an example of a portion of a monolith 300 that includes a catalyst system 310 deposited (or otherwise coated) on the surfaces of the monolith 300. In the example shown in FIG. 3, the portion of the monolith corresponds to a regular pattern of square cells that allow reactant gases (such as a reforming feed gas flow) to pass through the cells. In other aspects, any convenient type of cell shape can be used, such as round or hexagonal cells. The catalyst system 310 corresponds to a layer that includes catalyst 312 and a metal oxide support 314 that is coated on the surfaces of the cells of the monolith.

Structure (Monolith) for Supporting Catalyst System

One of the purposes of using a monolith or another supporting structure within a reforming environment is to increase the available surface area for holding a deposited catalyst/catalyst system. To achieve this, some monoliths correspond to a structure with a large plurality of cells or passages that allow gas flow through the monolith. Because each individual cell provides surface area for deposition of catalyst, including a large number of cells or passages per unit area can substantially increase the available surface area for catalyst.

Generally, the monolith or other structure used to support the catalyst/catalyst system can be formed from a material is denoted by the formula (PQ). P can be at least one metal selected from the group consisting of Al, Si, Mg, Ca, Sr, Ba, K, Na, Ti, Zr, Hf, V, Nb, Ta, Cr, Mo, W, Mn, Fe, Ni, Co, Y, La, Ce, and mixtures thereof. Q is oxide. Thus, the monolith material (PQ) is a metal oxide.

In some preferred aspects, the metal oxide can correspond to aluminum oxide (a.k.a. alumina), $Al_2O_3$. The preferred $Al_2O_3$ in this invention is $\alpha$-$Al_2O_3$. While $\alpha$-$Al_2O_3$ is the preferred crystalline phase, another phase containing sodium oxide ($Na_2O$), which is sometimes an unavoidable impurity in $\alpha$-$Al_2O_3$, could be also present, namely $Na_2O(Al_2O_3)_{11}$ or $NaAl_5O_8$.

Optionally, the monolith or structure material (PQ) can be $\alpha$-$Al_2O_3$ containing at least one additive oxide selected from the group consisting of $SiO_2$, MgO, CaO, $TiO_2$, $Na_2O$, $K_2O$, and mixtures thereof. The weight of additive oxide in the monolith materials composition can range from 0.1 wt % to 15 wt %, or 1.0 wt % to 10 wt %, or 2.0 wt % to 8.0 wt %, relative to the total weight of the monolith materials composition. As non-limiting illustrative examples, the monolith material (PQ) can be: i) 95 wt % $\alpha$-$Al_2O_3$ and 5 wt % $SiO_2$, ii) 93 wt % $\alpha$-$Al_2O_3$, 5 wt % $SiO_2$ and 2 wt % MgO, iii) 93 wt % $\alpha$-$Al_2O_3$, 4 wt % $SiO_2$, 2 wt % MgO and 1 wt % $Na_2O$, and iv) 95 wt % $\alpha$-$Al_2O_3$, 4 wt % $SiO_2$ and 1 wt. % $TiO_2$.

In other aspects, the monolith material (PQ) can be partially composed or substantially composed of non-alumina based oxides. As non-limiting illustrative examples, the monolith material (PQ) can be silica ($SiO_2$), magnesia (MgO), ceria ($CeO_2$), titania ($TiO_2$), zirconia ($ZrO_2$), cordierite ($2MgO\ 2Al_2O_3\ 2SiO_2$), mullite ($3Al_2O_3\ 2SiO_2$), aluminum titanate ($Al_2TiO_5$), magnesium aluminate ($MgAl_2O_4$), calcium-stabilized zirconia (CaO—$ZrO_2$), magnesium-stabilized zirconia (MgO—$ZrO_2$), yttria-stabilized zirconia ($Y_2O_3$—$ZrO_2$), yttria ($Y_2O_3$), barium zirconate ($BaZrO_3$), strontium zirconate ($SrZrO_3$), and mixtures thereof. Still other examples of potential monolith materials include SiC, $Si_3N_4$, yttrium-stabilized zirconia, and $Al_2TiO_5$ ceramics. It is noted that SiC and $Si_3N_4$ do not follow the (PQ) structural formula.

In some aspects, the monolith material (PQ) can further include supplementary components. Such supplementary components can facilitate easy extrusion and correspond to additional structural components within the monolith material composition. For example, the monolith material composition may further comprise one or more silicates comprising a metal selected from the group consisting of Al, Si, Ca, Mg, K, Na, Y, Zr, Hf, Ti, Cr, Mn, Fe, Ni, Co, and mixtures thereof. One example is bentonite, which is an aluminum phyllosilicate clay composed mostly of montmorillonite. The different types of bentonite are each named after the respective dominant element, such as potassium (K), sodium (Na), calcium (Ca), and aluminum (Al). For example, the chemical formula of sodium bentonite is $Al_2H_2Na_2O_{13}Si_4$. Some hydroxyl ions (OH—) can be present in silicates, but under high temperature calcination and sintering conditions, such hydroxyl groups can be converted to oxide form. Yet another example is talc, a clay mineral composed of hydrated magnesium silicate with the chemical formula $Mg_3Si_4O_{10}(OH)_2$. Due to its nature of basal cleavage and uneven flat fracture, it is foliated with a two-dimensional plate form which is beneficial in extrusion of the monolith material.

In various aspects, a monolith or other structure for providing a surface for the reforming catalyst system may be prepared by manufacturing techniques such as but not limited to conventional ceramic powder manufacturing and processing techniques, e.g., mixing, milling, degassing, kneading, pressing, extruding, casting, drying, calcining, and sintering. The starting materials can correspond to a suitable ceramic powder and an organic binder powder in a suitable volume ratio. Certain process steps may be controlled or adjusted to obtain the desired grain size and porosity range and performance properties, such as by inclusion of various manufacturing, property adjusting, and processing additives and agents as are generally known in the art. For example, the two or more types of oxide powders may be mixed in the presence of an organic binder and one or more appropriate solvents for a time sufficient to substantially disperse the powders in each other. As another example, precursors of the oxides present in a monolith may be dissolved in water at a desired ratio, spray dried, and calcined to make a mixed powder. Such precursors include (but are not limited to) chlorides, sulfates, nitrates, and mixtures thereof. The calcined powder can be further mixed in the presence of an organic binder and appropriate solvent(s) to make a mixed "dough". Then, the mixed "dough" of materials can be placed in a die or form, extruded, dried or otherwise formed into a desired shape. The resulting "green body" can then be sintered at temperatures in the range of about 1200° C.~1700° C. for at least ten minutes, such as from 10 minutes to 10 hours, or possibly from 10 minutes up to 48 hours or still longer.

The sintering operation may be performed in an oxidizing atmosphere, reducing atmosphere, or inert atmosphere, and at ambient pressure or under vacuum. For example, the oxidizing atmosphere could be air or oxygen, the inert atmosphere could be argon, and a reducing atmosphere could be hydrogen, $CO/CO_2$ or $H_2/H_2O$ mixtures. Thereafter, the sintered body is allowed to cool, typically to ambient conditions. The cooling rate may also be controlled to provide a desired set of grain and pore structures and performance properties in the particular component.

In some aspects, the monolith material (PQ) can further include an intermediate bond layer. The intermediate bond layer can be applied on monolith surfaces prior to washcoat active materials comprising metal oxide support and catalytic metal. The intermediate bond layer provides a better adherence to the washcoated active material. The intermediate bond layer is a metal oxide, $(M)_xO_y$, wherein (M) is at least one metal selected from the group consisting of Al, Si, Mg, Ca, Sr, Ba, K, Na, Ti, Zr, Hf, V, Nb, Ta, Cr, Mo, W, Mn, Fe, Ni, Co, Y, La, Ce, and mixtures thereof. Aluminum oxide (a.k.a. alumina), $Al_2O_3$, is a preferred metal oxide for the bond layer. As an example of how to form an intermediate bond layer, the selected metal oxide, $(M)_xO_y$, can be dispersed in a solution to form a slurry. The slurry can then be washcoated on the monolith. The monolith washcoated with the selected metal oxide, $(M)_xO_y$, is dried and sintered at temperatures in the range of 1100° C.~1600° C. to make the intermediate bonding layer.

It has been discovered that limiting the maximum porosity in the final sintered body tends to effectively, if not actually, limit interconnectivity of the pore spaces with other pore spaces to an extent that increases or maximizes volumetric heat capacity of the sintered body. The porosity ranges for a monolith or other structure can depend upon the desired final component performance properties, but are within a range defined by one or more of the minimum porosity values and one or more of the maximum porosity values, or any set of values not expressly enumerated between the minimums and maximums. Examples of suitable porosity values are 0 vol % to 20 vol % porosity, or 0 vol % to 15 vol %, or 0 vol % to 10 vol %, or 0 vol % to 5 vol %.

The sintered monolith and/or other formed ceramic structure can have any convenient shape suitable for use as a surface for receiving a catalyst or catalyst system. An example of a monolith can be an extruded honeycomb monolith. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square, trigonal, or hexagonal) cross-section and two- or three-dimensionally stacking such blocks above, behind, and beside each other. Monoliths can be attractive as reactor internal structures because they provide high heat transfer capacity with minimum pressure drop.

In some aspects, honeycomb monoliths can be characterized as having open frontal area (or geometric void volume) between 25% and 55%, and having conduit density between 50 and 2000 pores or cells per square inch (CPSI), or between 100 and 900 cells per square inch, or between 100 cells per square inch to 600 cells per square inch. For example, in one embodiment, the conduits may have a diameter/characteristic cell side length of only a few millimeters, such as on the order of roughly one millimeter. Reactor media components, such as the monoliths or alternative bed media, can provide for channels that include a packing with an average wetted surface area per unit volume that ranges from 50 ft$^{-1}$ to 3000 ft$^{-1}$ (~0.16 km$^{-1}$ to ~10 km$^{-1}$), or from 100 ft$^{-1}$ to 2500 ft$^{-1}$ (~0.32 km$^{-1}$ to ~8.2 km$^{-1}$), or from 200 ft$^{-1}$ to 2000 ft$^{-1}$ (~0.65 km$^{-1}$ to ~6.5 km$^{-1}$), based upon the volume of the first reactor that is used to convey a reactant. These relatively high surface area per unit volume values can aid in achieving a relatively quick change in the temperature through the reactor, such as generally illustrated by the relatively steep slopes in the exemplary temperature gradient profile graphs shown in FIG. 1(a) or 1(b) of FIG. 1.

Reactor media components can also provide for channels that include a packing that includes a high volumetric heat transfer coefficient (e.g., 0.02 cal/cm$^3$s° C. or more, or 0.05 cal/cm$^3$s° C. or more, or 0.10 cal/cal/cm$^3$s° C. or more); that have low resistance to flow (low pressure drop); that have an operating temperature range consistent with the highest temperatures encountered during regeneration; that have high resistance to thermal shock; and/or that have high bulk heat capacity (e.g., 0.10 cal/cm$^3$s° C. or more, or 0.20 cal/cm$^3$s° C. or more). As with the high surface area values, these relatively high volumetric heat transfer coefficient values and/or other properties can aid in achieving a relatively quick change in the temperature through the reactor, such as generally illustrated by the relatively steep slopes in the exemplary temperature gradient profile graphs, such as in FIGS. 1(a) and 1(b) of FIG. 1. The cited values are averages based upon the volume of reactor used for conveyance of a reactant.

In various aspects, adequate heat transfer rate can be characterized by a heat transfer parameter, $\Delta THT$, below 500° C., or below 100° C., or below 50° C. The parameter $\Delta THT$, as used herein, is the ratio of the bed-average volumetric heat transfer rate that is needed for recuperation, to the volumetric heat transfer coefficient of the bed, hv. The volumetric heat transfer rate (e.g. cal/cm$^3$ sec) that is sufficient for recuperation can be calculated as the product of the gas flow rate (e.g. g/sec) with the gas heat capacity (e.g. cal/g° C.) and desired end-to-end temperature change (excluding any reaction, e.g. ° C.), and then this quantity can be divided by the volume (e.g. cm$^3$) of the reactor (or portion of a reactor) traversed by the gas. The volumetric heat transfer coefficient of the bed, hv, can typically be calculated as the product of an area-based coefficient (e.g. cal/cm$^2$s° C.) and a specific surface area for heat transfer (av, e.g. cm$^2$/cm$^3$), often referred to as the wetted area of the packing.

Process Example—Reverse Flow Reforming and Regeneration

In various aspects, reforming of hydrocarbons can be performed under steam reforming conditions in the presence of H$_2$O, under dry reforming conditions in the presence of CO$_2$, or under conditions where both H$_2$O and CO$_2$ are present in the reaction environment. As a general overview of operation during reforming in a swing reactor, such as a reverse flow reactor, a regeneration step or portion of a reaction cycle can be used to provide heat for the reactor. Reforming can then occur within the reactor during a reforming step or portion of the cycle, with the reforming reaction consuming heat provided during the reactor regeneration step. During reactor regeneration, fuel and an oxidant are introduced into the reactor from a regeneration end of the reactor. The bed and/or monoliths in the regeneration portion of the reactor can absorb heat, but typically do not include a catalyst for reforming. As the fuel and oxidant pass through the regeneration section, heat is transferred from the regeneration section to the fuel and oxidant. Combustion does not occur immediately, but instead the location of combustion is controlled to occur in a middle portion of the reactor. The flow of the reactants continues during the regeneration step, leading to additional transfer of the heat generated from combustion into the reforming end of the reactor.

After a sufficient period of time, the combustion reaction is stopped. Any remaining combustion products and/or reactants can optionally be purged. The reforming step or portion of the reaction cycle can then start. The reactants for reforming can be introduced into the reforming end of the reactor, and thus flow in effectively the opposite direction relative to the flow during regeneration. The bed and/or monoliths in the reforming portion of the reactor can include a catalyst for reforming. In various aspects, at least a portion of the catalyst can correspond to a catalyst formed from a ceramic composition as described herein. As reforming occurs, the heat introduced into the reforming zone during combustion can be consumed by the endothermic reforming reaction. After exiting the reforming zone, the reforming products (and unreacted reactants) are no longer exposed to a reforming catalyst. As the reforming products pass through the regeneration zone, heat can be transferred from the products to the regeneration zone. After a sufficient period of time, the reforming process can be stopped, remaining reforming products can optionally be collected or purged from the reactor, and the cycle can start again with a regeneration step.

The reforming reaction performed within the reactor can correspond reforming of methane and/or other hydrocarbons using steam reforming, in the presence of H$_2$O; using dry reforming, in the presence of CO$_2$, or using "bi" reforming in the presence of both H$_2$O and CO$_2$. Examples of stoichiometry for steam, dry, and "bi" reforming of methane are shown in equations (1)-(3).

$$\text{Dry Reforming: } CH_4+CO_2=2CO+2H_2 \qquad (1)$$

$$\text{Steam Reforming: } CH_4+H_2O=CO+3H_2 \qquad (2)$$

$$\text{Bi Reforming: } 3CH_4+2H_2O+CO_2=4CO+8H_2. \qquad (3)$$

As shown in equations (1)-(3), dry reforming can produce lower ratios of H$_2$ to CO than steam reforming. Reforming reactions performed with only steam can generally produce a ratio of H$_2$ to CO of around 3, such as 2.5 to 3.5. By contrast, reforming reactions performed in the presence of CO$_2$ can generate much lower ratios, possibly approaching a ratio of H$_2$ to CO of roughly 1.0 or even lower. By using a combination of CO$_2$ and H$_2$O during reforming, the reforming reaction can potentially be controlled to generate a wide variety of H$_2$ to CO ratios in a resulting syngas.

It is noted that the ratio of H$_2$ to CO in a synthesis gas can also be dependent on the water gas shift equilibrium. Although the above stoichiometry shows ratios of roughly 1 or roughly 3 for dry reforming and steam reforming, respectively, the equilibrium amounts of H$_2$ and CO in a synthesis gas can be different from the reaction stoichiometry. The equilibrium amounts can be determined based on the water gas shift equilibrium, which relates the concentrations of H$_2$, CO, CO$_2$ and H$_2$O based on the reaction:

$$H_2O+CO<=>H_2+CO_2. \qquad (4)$$

Most reforming catalysts, such as rhodium and/or nickel, can also serve as water gas shift catalysts. Thus, if reaction environment for producing H$_2$ and CO also includes H$_2$O and/or CO$_2$, the initial stoichiometry from the reforming reaction may be altered based on the water gas shift equilibrium. This equilibrium is also temperature dependent, with higher temperatures favoring production of CO and H$_2$O. It is noted that higher temperatures can also improve the rate for reaching equilibrium. As a result, the ability to perform a reforming reaction at elevated temperatures can potentially provide several benefits. For example, instead of performing steam reforming in an environment with excess H$_2$O, CO$_2$ can be added to the reaction environment. This can allow for both a reduction in the ratio of H$_2$ to CO produced based on the dry reforming stoichiometry as well as a reduction in the ratio of H$_2$ to CO produced based on the water gas shift equilibrium. Alternatively, if a higher H$_2$ to CO ratio is desired, CO$_2$ can be removed from the environment, and the ratio of H$_2$O to CH$_4$ (or other hydrocarbons) can be controlled to produce a desirable type of synthesis gas. This can potentially allow for generation of a synthesis gas having a H$_2$ to CO ratio of 0.1 to 15, or 0.1 to 3.0, or 0.5 to 5.0, or 1.0 to 10, by selecting appropriate amounts of feed components.

The reforming reactions shown in equations (1)-(3) are endothermic reactions. One of the challenges in commercial scale reforming can be providing the heat for performing the reforming reaction in an efficient manner while reducing or minimizing introduction of additional components into the desired synthesis gas product. Cyclic reaction systems, such as reverse flow reactor systems, can provide heat in a desirable manner by having a cycle including a reforming step and a regeneration step. During the regeneration step, combustion can be performed within a selected area of the reactor. A gas flow during regeneration can assist with transferring this heat from the combustion zone toward additional portions of the reforming zone in the reactor. The reforming step within the cycle can be a separate step, so that incorporation of products from combustion into the reactants and/or products from reforming can be reduced or minimized. The reforming step can consume heat, which can reduce the temperature of the reforming zone. As the products from reforming pass through the reactor, the reforming products can pass through a second zone that lacks a reforming or water gas shift catalyst. This can allow the reaction products to cool prior to exiting the reactor. The heat transferred from the reforming products to the reactor can then be used to increase the temperature of the reactants for the next combustion or regeneration step.

One common source for methane is natural gas. In some applications, natural gas, including associated hydrocarbon and impurity gases, may be used as a feed for the reforming reaction. The supplied natural gas also may be sweetened and/or dehydrated natural gas. Natural gas commonly includes various concentrations of associated gases, such as ethane and other alkanes, preferably in lesser concentrations than methane. The supplied natural gas may include impurities, such as $H_2S$ and nitrogen. More generally, the hydrocarbon feed for reforming can include any convenient combination of methane and/or other hydrocarbons. Optionally, the reforming feed may also include some hydrocarbonaceous compounds, such as alcohols or mercaptans, which are similar to hydrocarbons but include one or more heteroatoms different from carbon and hydrogen. In some aspects, an additional component present in the feed can correspond to impurities such as sulfur that can adsorb to the catalytic monolith during a step in a reaction cycle that has a reducing environment (such as a reforming step). Such impurities can be oxidized in a subsequent cycle to form sulfur oxides, which can then be reduced to release additional sulfur-containing components (or other impurity-containing components) into the reaction environment.

In some aspects, the feed for reforming can include, relative to a total weight of hydrocarbons in the feed for reforming, 5 wt % or more of $C_{2+}$ compounds, such as ethane or propane, or 10 wt % or more, or 15 wt % or more, or 20 wt % or more, such as up to 50 wt % or possibly still higher. It is noted that nitrogen and/or other gases that are non-reactive in a combustion environment, such as $H_2O$ and $CO_2$, may also be present in the feed for reforming. In aspects where the reformer corresponds to an on-board reforming environment, such non-reactive products can optionally be introduced into the feed, for example, based on recycle of an exhaust gas into the reformer. Additionally or alternately, the feed for reforming can include 40 wt % or more methane, or 60 wt % or more, or 80 wt % or more, or 95 wt % or more, such as having a feed that is substantially composed of methane (98 wt % or more). In aspects where the reforming corresponds to steam reforming, a molar ratio of steam molecules to carbon atoms in the feed can be 0.3 to 4.0. It is noted that methane has 1 carbon atom per molecule while ethane has 2 carbon atoms per molecule. In aspects where the reforming corresponds to dry reforming, a molar ratio of $CO_2$ molecules to carbon atoms in the feed can be 0.05 to 3.0.

Within the reforming zone of a reverse flow reactor, the temperature can vary across the zone due to the nature of how heat is added to the reactor and/or due to the kinetics of the reforming reaction. The highest temperature portion of the zone can typically be found near a middle portion of the reactor. This middle portion can be referred to as a mixing zone where combustion is initiated during regeneration. At least a portion of the mixing zone can correspond to part of the reforming zone if a monolith with reforming catalyst extends into the mixing zone. As a result, the location where combustion is started during regeneration can typically be near to the end of the reforming zone within the reactor. Moving from the center of the reactor to the ends of the reactor, the temperature can decrease. As a result, the temperature at the beginning of the reforming zone (at the end of the reactor) can be cooler than the temperature at the end of the reforming zone (in the middle portion of the reactor).

As the reforming reaction occurs, the temperature within the reforming zone can be reduced. The rate of reduction in temperature can be related to the kinetic factors of the amount of available hydrocarbons for reforming and/or the temperature at a given location within the reforming zone. As the reforming feed moves through the reforming zone, the reactants in the feed can be consumed, which can reduce the amount of reforming that occurs at downstream locations. However, the increase in the temperature of the reforming zone as the reactants move across the reforming zone can lead to an increased reaction rate.

At roughly 500° C., the reaction rate for reforming can be sufficiently reduced that little or no additional reforming will occur. As a result, in some aspects as the reforming reaction progresses, the beginning portion of the reforming zone can cool sufficiently to effectively stop the reforming reaction within a portion of the reforming zone. This can move the location within the reactor where reforming begins to a location that is further downstream relative to the beginning of the reforming zone. When a sufficient portion of the reforming zone has a temperature below 500° C., or below 600° C., the reforming step within the reaction cycle can be stopped to allow for regeneration. Alternatively, based on the amount of heat introduced into the reactor during regeneration, the reforming portion of the reaction cycle can be stopped based on an amount of reaction time, so that the amount of heat consumed during reforming (plus heat lost to the environment) is roughly in balance with the amount of heat added during regeneration. After the reforming process is stopped, any remaining synthesis gas product still in the reactor can optionally be recovered prior to starting the regeneration step of the reaction cycle.

The regeneration process can then be initiated. During regeneration, a fuel such as methane, natural gas, or $H_2$, and oxygen can be introduced into the reactor and combusted. The location where the fuel and oxidant are allowed to mix can be controlled in any convenient manner, such as by introducing the fuel and oxidant via separate channels. By delaying combustion during regeneration until the reactants reach a central portion of the reactor, the non-reforming end of the reactor can be maintained at a cooler temperature. This can also result in a temperature peak in a middle portion of the reactor. The temperature peak can be located within a portion of the reactor that also includes the reforming catalyst. During a regeneration cycle, the temperature within the reforming reactor can be increased sufficiently to allow for the reforming during the reforming portion of the cycle. This can result in a peak temperature within the reactor of 1100° C. or more, or 1200° C. or more, or 1300° C. or more, or potentially a still higher temperature.

The relative length of time and reactant flow rates for the reforming and regeneration portions of the process cycle can be selected to balance the heat provided during regeneration with the heat consumed during reforming. For example, one option can be to select a reforming step that has a similar length to the regeneration step. Based on the flow rate of hydrocarbons, $H_2O$, and/or $CO_2$ during the reforming step, an endothermic heat demand for the reforming reaction can be determined. This heat demand can then be used to calculate a flow rate for combustion reactants during the regeneration step. Of course, in other aspects the balance of heat between reforming and regeneration can be determined in other manners, such as by determining desired flow rates for the reactants and then selecting cycle lengths so that the heat provided by regeneration balances with the heat consumed during reforming.

In addition to providing heat, the reactor regeneration step during a reaction cycle can also allow for coke removal from the catalyst within the reforming zone. In various aspects, one or more types of catalyst regeneration can potentially occur during the regeneration step. One type of catalyst regeneration can correspond to removal of coke from the catalyst. During reforming, a portion of the hydrocarbons introduced into the reforming zone can form coke instead of forming CO or $CO_2$. This coke can potentially block access to the catalytic sites (such as metal sites) of the catalyst. In some aspects, the rate of formation can be increased in portions of the reforming zone that are exposed to higher temperatures, such as portions of the reforming zone that are exposed to temperatures of 800° C. or more, or 900° C. or more, or 1000° C. or more. During a regeneration step, oxygen can be present as the temperature of the reforming zone is increased. At the temperatures achieved during regeneration, at least a portion of the coke generated during reforming can be removed as CO or $CO_2$.

Due to the variation in temperature across the reactor, several options can be used for characterizing the temperature within the reactor and/or within the reforming zone of the reactor. One option for characterizing the temperature can be based on an average bed or average monolith temperature within the reforming zone. In practical settings, determining a temperature within a reactor requires the presence of a measurement device, such as a thermocouple. Rather than attempting to measure temperatures within the reforming zone, an average (bed or monolith) temperature within the reforming zone can be defined based on an average of the temperature at the beginning of the reforming zone and a temperature at the end of the reforming zone. Another option can be to characterize the peak temperature within the reforming zone after a regeneration step in the reaction cycle. Generally, the peak temperature can occur at or near the end of the reforming zone, and may be dependent on the location where combustion is initiated in the reactor. Still another option can be to characterize the difference in temperature at a given location within the reaction zone at different times within a reaction cycle. For example, a temperature difference can be determined between the temperature at the end of the regeneration step and the temperature at the end of the reforming step. Such a temperature difference can be characterized at the location of peak temperature within the reactor, at the entrance to the reforming zone, at the exit from the reforming zone, or at any other convenient location.

In various aspects, the reaction conditions for reforming hydrocarbons can include one or more of an average reforming zone temperature ranging from 400° C. to 1200° (or more); a peak temperature within the reforming zone of 800° C. to 1600° C.; a temperature difference at the location of peak temperature between the end of a regeneration step and the end of the subsequent reforming step of 25° C. or more, or 50° C. or more, or 100° C. or more, or 200° C. or more, such as up to 800° C. or possibly still higher; a temperature difference at the entrance to the reforming zone between the end of a regeneration step and the end of the subsequent reforming step of 25° C. or more, or 50° C. or more, or 100° C. or more, or 200° C. or more, such as up to 800° C. or possibly still higher; and/or a temperature difference at the exit from the reforming zone between the end of a regeneration step and the end of the subsequent reforming step of 25° C. or more, or 50° C. or more, or 100° C. or more, or 200° C. or more, such as up to 800° C. or possibly still higher.

With regard to the average reforming zone temperature, in various aspects the average temperature for the reforming zone can be 500° C. to 1500° C., or 400° C. to 1200° C., or 800° C. to 1200° C., or 400° C. to 900° C., or 600° C. to 1100° C., or 500° C. to 1000° C. Additionally or alternately, with regard to the peak temperature for the reforming zone (likely corresponding to a location in the reforming zone close to the location for combustion of regeneration reactants), the peak temperature can be 800° C. to 1600° C., or 1000° C. to 1400° C., or 1200° C. to 1600° C., or 1200° C. to 1400° C.

Additionally or alternately, the reaction conditions for reforming hydrocarbons can include a pressure of 0 psig to 1500 psig (10.3 MPa), or 0 psig to 1000 psig (6.9 MPa), or 0 psig to 550 psig (3.8 MPa); and a gas hourly space velocity of reforming reactants of 1000 $hr^{-1}$ to 50,000 $hr^{-1}$. The space velocity corresponds to the volume of reactants relative to the volume of monolith per unit time. The volume of the monolith is defined as the volume of the monolith as if it was a solid cylinder.

In some aspects, an advantage of operating the reforming reaction at elevated temperature can be the ability to convert substantially all of the methane and/or other hydrocarbons in a reforming feed. For example, for a reforming process where water is present in the reforming reaction environment (i.e., steam reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %

In other aspects, for a reforming process where carbon dioxide is present in the reforming reaction environment (i.e., dry reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %.

In some alternative aspects, the reforming reaction can be performed under dry reforming conditions, where the reforming is performed with $CO_2$ as a reagent but with a reduced or minimized amount of $H_2O$ in the reaction environment. In such alternative aspects, a goal of the reforming reaction can be to produce a synthesis gas with a $H_2$ to CO ratio of 1.0 or less. In some aspects, the temperature during reforming can correspond to the temperature ranges described for steam reforming. Optionally, in some aspects a dry reforming reaction can be performed at a lower temperature of between 500° C. to 700° C., or 500° C. to 600° C. In such aspects, the ratio of $H_2$ to CO can be 0.3 to 1.0, or 0.3 to 0.7, or 0.5 to 1.0. Performing the dry reforming reaction under these conditions can also lead to substantial coke production, which can require removal during regeneration in order to maintain catalytic activity.

Example of Reverse Flow Reactor Configuration

For endothermic reactions operated at elevated temperatures, such as hydrocarbon reforming, a reverse flow reactor can provide a suitable reaction environment for providing the heat for the endothermic reaction.

In a reverse flow reactor, the heat needed for an endothermic reaction may be provided by creating a high-temperature heat bubble in the middle of the reactor. A two-step process can then be used wherein heat is (a) added to the reactor bed(s) or monolith(s) via in-situ combustion, and then (b) removed from the bed in-situ via an endothermic process, such as reforming, pyrolysis, or steam cracking. This type of configuration can provide the ability to consistently manage and confine the high temperature bubble in a reactor region(s) that can tolerate such conditions long term. A reverse flow reactor system can allow the primary endothermic and regeneration processes to be performed in a substantially continuous manner.

A reverse flow reactor system can include first and second reactors, oriented in a series relationship with each other with respect to a common flow path, and optionally but preferably along a common axis. The common axis may be horizontal, vertical, or otherwise. During a regeneration step, reactants (e.g., fuel and oxygen) are permitted to combine or mix in a reaction zone to combust therein, in-situ, and create a high temperature zone or heat bubble inside a middle portion of the reactor system. The heat bubble can correspond to a temperature that is at least about the initial temperature for the endothermic reaction. Typically, the temperature of the heat bubble can be greater than the initial temperature for the endothermic reaction, as the temperature will decrease as heat is transferred from the heat bubble in a middle portion of the reactor toward the ends of the reactor. In some aspects, the combining can be enhanced by a reactant mixer that mixes the reactants to facilitate substantially complete combustion/reaction at the desired location, with the mixer optionally located between the first and second reactors. The combustion process can take place over a long enough duration that the flow of first and second reactants through the first reactor also serves to displace a substantial portion, (as desired) of the heat produced by the reaction (e.g., the heat bubble), into and at least partially through the second reactor, but preferably not all of the way through the second reactor to avoid waste of heat and overheating the second reactor. The flue gas may be exhausted through the second reactor, but preferably most of the heat is retained within the second reactor. The amount of heat displaced into the second reactor during the regeneration step can also be limited or determined by the desired exposure time or space velocity that the hydrocarbon feed gas will have in the endothermic reaction environment.

After regeneration or heating the second reactor media (such as a phase stable monolith as described herein), in the next/reverse step or cycle, reactants for the endothermic reaction methane (and/or natural gas and/or another hydrocarbon) can be supplied or flowed through the second reactor, from the direction opposite the direction of flow during the heating step. For example, in a reforming process, methane (and/or natural gas and/or another hydrocarbon) can be supplied or flowed through the second reactor. The methane can contact the hot second reactor and mixer media, in the heat bubble region, to transfer the heat to the methane for reaction energy.

For some aspects, the basic two-step asymmetric cycle of a reverse flow regenerative bed reactor system is depicted in FIGS. 1(a) and 1(b) of FIG. 1 in terms of a reactor system having two zones/reactors; a first or recuperator/quenching zone (7) and a second or reaction zone (1). Both the reaction zone (1) and the recuperator zone (7) can contain regenerative monoliths and/or other regenerative structures. Regenerative monoliths or other regenerative structures, as used herein, comprise materials that are effective in storing and transferring heat as well as being effective for carrying out a chemical reaction. The regenerative monoliths and/or other structures can correspond to any convenient type of material that is suitable for storing heat, transferring heat, and catalyzing a reaction. Examples of structures can include bedding or packing material, ceramic beads or spheres, ceramic honeycomb materials, ceramic tubes, extruded monoliths, and the like, provided they are competent to maintain integrity, functionality, and withstand long term exposure to temperatures in excess of 1200° C., or in excess of 1400° C., or in excess of 1600° C., which can allow for some operating margin.

To facilitate description of FIG. 1, the reactor is described herein with reference to a reforming reaction. It is understood that other convenient types of endothermic reactions can generally be performed using a reverse flow reactor, such as the reactor shown in FIG. 1.

As shown in FIG. 1(a) of FIG. 1, at the beginning of the "reaction" step of the cycle, a secondary end 5 of the reaction zone 1 (a.k.a. herein as the second reactor) can be at an elevated temperature as compared to the primary end 3 of the reaction zone 1, and at least a portion (including the first end 9) of the recuperator or quench zone 7 (a.k.a. herein as the first reactor), can be at a lower temperature than the reaction zone 1 to provide a quenching effect for the resulting product. In an aspect where the reactors are used to perform reverse flow reforming, a methane-containing reactant feed (or other hydrocarbon-containing reactant feed) can be introduced via a conduit(s) 15, into a primary end 3 of the reforming or reaction zone 1. In various aspects, the hydrocarbon-containing reactant feed can also contain $H_2O$, $CO_2$, or a combination thereof.

The feed stream from inlet(s) 15 can absorb heat from reaction zone 1 and endothermically react to produce the desired synthesis gas product. As this step proceeds, a shift in the temperature profile 2, as indicated by the arrow, can be created based on the heat transfer properties of the system. When the ceramic catalyst monolith/other catalyst structure is designed with adequate heat transfer capability, this profile can have a relatively sharp temperature gradient, which gradient can move across the reaction zone 1 as the reforming step proceeds. In some aspects, a sharper temperature gradient profile can provide for improved control over reaction conditions. In aspects where another type of endothermic reaction is performed, a similar shift in temperature profile can occur, so that a temperature gradient moves across reaction zone 1 as the reaction step proceeds.

The effluent from the reforming reaction, which can include unreacted feed components (hydrocarbons, $H_2O$, $CO_2$) as well as synthesis gas components, can exit the reaction zone 1 through a secondary end 5 at an elevated temperature and pass through the recuperator reactor 7, entering through a second end 11, and exiting at a first end 9. The recuperator 7 can initially be at a lower temperature than the reaction zone 1. As the products (and optionally unreacted feed) from the reforming reaction pass through the recuperator zone 7, the gas can be quenched or cooled to a temperature approaching the temperature of the recuperator zone substantially at the first end 9, which in some embodiments can be approximately the same temperature as the regeneration feed introduced via conduit 19 into the recuperator 7 during the second step of the cycle. As the reforming effluent is cooled in the recuperator zone 7, a temperature gradient 4 can be created in the zone's regenerative bed(s) and can move across the recuperator zone 7 during this step. The quenching can heat the recuperator 7, which can be cooled again in the second step to later provide another quenching service and to prevent the size and location of the heat bubble from growing progressively through the quench reactor 7. After quenching, the reaction gas can exit the recuperator at 9 via conduit 17 and can be processed for separation and recovery of the various components.

The second step of the cycle, referred to as the regeneration step, can then begin with reintroduction of the first and second regeneration reactants via conduit(s) 19. The first and second reactants can pass separately through hot recuperator 7 toward the second end 11 of the recuperator 7, where they can be combined for exothermic reaction or combustion in or near a central region 13 of the reactor system.

An example of the regeneration step is illustrated in FIG. 1(*b*) of FIG. 1. Regeneration can entail transferring recovered sensible heat from the recuperator zone 7 to the reaction zone 1 to thermally regenerate the reaction beds 1 for the subsequent reaction cycle. Regeneration gas/reactants can enter recuperator zone 7, such as via conduit(s) 19, and flow through the recuperator zone 7 and into the reaction zone 1. In doing so, the temperature gradients 6 and 8 may move across the beds as illustrated by the arrows on the exemplary graphs in FIG. 1(*b*), similar to but in opposite directions to the graphs of the temperature gradients developed during the reaction cycle in FIG. 1(*a*) of FIG. 1. Fuel and oxidant reactants may combust at a region proximate to the interface 13 of the recuperator zone 7 and the reaction zone 1. The heat recovered from the recuperator zone together with the heat of combustion can be transferred to the reaction zone, thermally regenerating the regenerative reaction monoliths and/or beds 1 disposed therein.

In some aspects, several of the conduits within a channel may convey a mixture of first and second reactants, due at least in part to some mixing at the first end (17) of the first reactor. However, the numbers of conduits conveying combustible mixtures of first and second reactants can be sufficiently low such that the majority of the stoichiometrically reactable reactants will not react until after exiting the second end of the first reactor. The axial location of initiation of combustion or exothermic reaction within those conduits conveying a mixture of reactants can be controlled by a combination of temperature, time, and fluid dynamics. Fuel and oxygen usually require a temperature-dependent and mixture-dependent autoignition time to combust. Still though, some reaction may occur within an axial portion of the conduits conveying a mixture of reactants. However, this reaction can be acceptable because the number of channels having such reaction can be sufficiently small that there is only an acceptable or inconsequential level of effect upon the overall heat balance within the reactor. The design details of a particular reactor system can be selected so as to avoid mixing of reactants within the conduits as much as reasonably possible.

Figure 2:
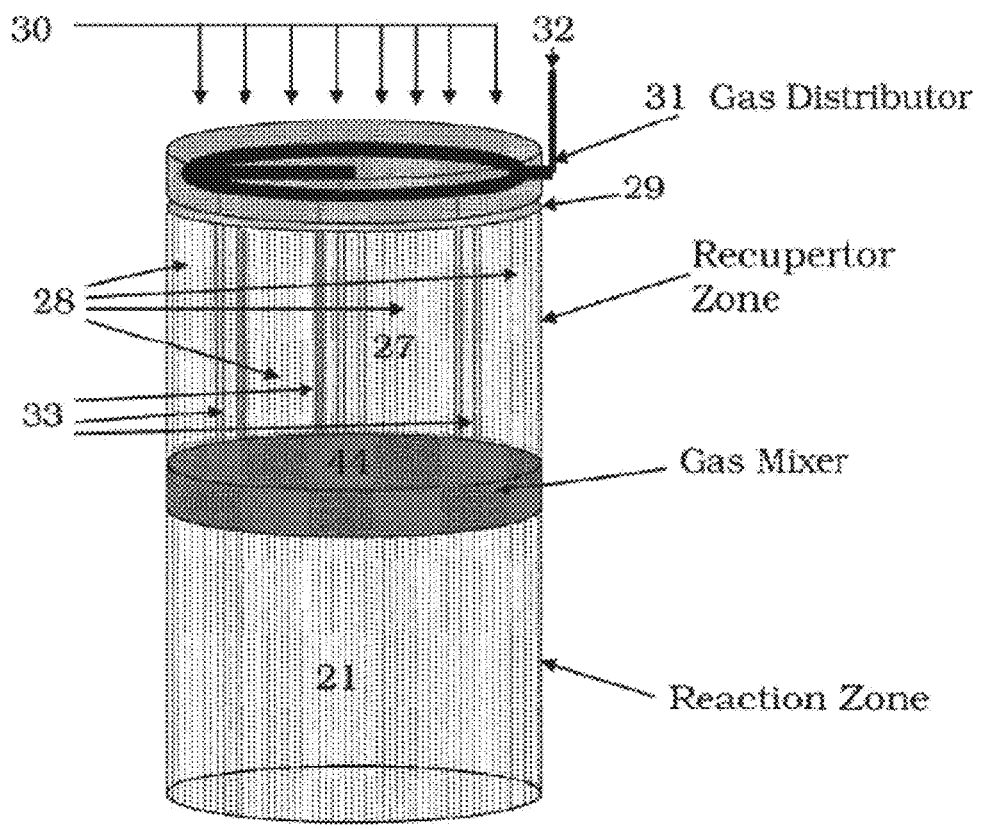
FIG. 2 shows an example of a reverse flow reactor.

FIG. 2 illustrates another exemplary reactor system that may be suitable in some applications for controlling and deferring the combustion of fuel and oxidant to achieve efficient regeneration heat. FIG. 2 depicts a single reactor system, operating in the regeneration cycle. The reactor system may be considered as comprising two reactor zones. The recuperator 27 can be the zone primarily where quenching takes place and provides substantially isolated flow paths or channels for transferring both of the quenching reaction gases through the reactor media, without incurring combustion until the gasses arrive proximate or within the reactor core 13 in FIG. 1. The reformer 2 can be the reactor where regeneration heating and methane (and/or hydrocarbon) reformation primarily occurs, and may be considered as the second reactor for purposes herein. Although the first and second reactors in the reactor system are identified as separately distinguishable reactors, it is understood that the first and second reactors may be manufactured, provided, or otherwise combined into a common single reactor bed, whereby the reactor system might be described as comprising merely a single reactor that integrates both cycles within the reactor. The terms "first reactor" and "second reactor" can merely refer to the respective zones within the reactor system whereby each of the regeneration, reformation, quenching, etc., steps take place and do not require that separate components be utilized for the two reactors. However, various aspects can comprise a reactor system whereby the recuperator reactor includes conduits and channels as described herein, and the reformer reactor may similarly possess conduits. Additionally or alternatively, some aspects may include a reformer reactor bed that is arranged different from and may even include different materials from, the recuperator reactor bed.

As discussed previously, the first reactor or recuperator 27 can include various gas conduits 28 for separately channeling two or more gases following entry into a first end 29 of the recuperator 27 and through the regenerative bed(s) disposed therein. A first gas 30 can enter a first end of a plurality of flow conduits 28. In addition to providing a flow channel, the conduits 28 can also comprise effective flow barriers (e.g., which effectively function such as conduit walls) to prevent cross flow or mixing between the first and second reactants and maintain a majority of the reactants effectively separated from each other until mixing is permitted. As discussed previously, each of the first and second channels can comprise multiple channels or flow paths. The first reactor may also comprise multiple substantially parallel flow segments, each comprising segregated first and second channels.

In some aspects, the recuperator can be comprised of one or more extruded honeycomb monoliths, as described above. Each monolith may provide flow channel(s) (e.g., flow paths) for one of the first or second reactants. Each channel preferably includes a plurality of conduits. Alternatively, a monolith may comprise one or more channels for each reactant with one or more channels or groups of conduits dedicated to flowing one or more streams of a reactant, while the remaining portion of conduits flow one or more streams of the other reactant. It is recognized that at the interface between channels, a number of conduits may convey a mixture of first and second reactant, but this number of conduits is proportionately small.

Alternative embodiments may use reactor media other than monoliths, such as whereby the channel conduits/flow paths may include a more tortuous pathways (e.g. convoluted, complex, winding and/or twisted but not linear or tubular), including but not limited to labyrinthine, variegated flow paths, conduits, tubes, slots, and/or a pore structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator 27. Such other types of reactor media can be suitable, so long as at least a portion of such media can be formed by sintering a ceramic catalytic composition as described herein, followed by exposing such media to reducing conditions to activate the catalyst. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure.

In some aspects, the reverse flow reactor can include some type of equipment or method to direct a flow stream of one of the reactants into a selected portion of the conduits. In the exemplary embodiment of FIG. 2, a gas distributor 31 can direct a second gas stream 32 to second gas stream channels that are substantially isolated from or not in fluid communication with the first gas channels, here illustrated as channels 33. The result can be that at least a portion of gas stream 33 is kept separate from gas stream 30 during axial transit of the recuperator 27. In some aspects, the regenerative bed(s) and/or monolith(s) of the recuperator zone can comprise channels having a gas or fluid barrier that isolates the first reactant channels from the second reactant channels. Thereby, both of the at least two reactant gases that transit the channel means may fully transit the regenerative bed(s), to quench the regenerative bed, absorb heat into the reactant gases, before combining to react with each other in the combustion zone.

In various aspects, gases (including fluids) 30 and 32 can each comprise a component that reacts with a component in the other reactant 30 and 32, to produce an exothermic reaction when combined. For example, each of the first and second reactant may comprise one of a fuel gas and an oxidant gas that combust or burn when combined with the other of the fuel and oxidant. By keeping the reactants substantially separated, the location of the heat release that occurs due to exothermic reaction can be controlled. In some aspects "substantially separated" can be defined to mean that at least 50 percent, or at least 75 percent, or at least 90 percent of the reactant having the smallest or limiting stoichiometrically reactable amount of reactant, as between the first and second reactant streams, has not become consumed by reaction by the point at which these gases have completed their axial transit of the recuperator 27. In this manner, the majority of the first reactant 30 can be kept isolated from the majority of the second reactant 32, and the majority of the heat release from the reaction of combining reactants 30 and 32 can take place after the reactants begin exiting the recuperator 27. The reactants can be gases, but optionally some reactants may comprise a liquid, mixture, or vapor phase.

The percent reaction for these regeneration streams is meant the percent of reaction that is possible based on the stoichiometry of the overall feed. For example, if gas 30 comprised 100 volumes of air (80 volumes $N_2$ and 20 Volumes $O_2$), and gas 32 comprised 10 volumes of hydrogen, then the maximum stoichiometric reaction would be the combustion of 10 volumes of hydrogen ($H_2$) with 5 volumes of oxygen ($O_2$) to make 10 volumes of $H_2O$. In this case, if 10 volumes of hydrogen were actually combusted in the recuperator zone (27), this would represent 100% reaction of the regeneration stream. This is despite the presence of residual un-reacted oxygen, because in this example the un-reacted oxygen was present in amounts above the stoichiometric requirement. Thus, in this example the hydrogen is the stoichiometrically limiting component. Using this definition, less than 50% reaction, or less than 25% reaction, or less than 10% reaction of the regeneration streams can occur during the axial transit of the recuperator (27).

In various aspects, channels 28 and 33 can comprise ceramic (including zirconia), alumina, or other refractory material capable of withstanding temperatures exceeding 1200° C., or 1400° C., or 1600° C. Additionally or alternately, channels 28 and 33 can have a wetted area between 50 $ft^{-1}$ and 3000 $ft^{-1}$, or between 100 $ft^{-1}$ and 2500 $ft^{-1}$, or between 200 $ft^{-1}$ and 2000 $ft^{-1}$.

Referring again briefly to FIG. 1, the reactor system can includes a first reactor 7 containing a first end 9 and a second end 11, and a second reactor 1 containing a primary end 3 and a secondary end 5. The embodiments illustrated in FIGS. 1 and 2 are merely simple illustrations provided for explanatory purposes only and are not intended to represent a comprehensive embodiment. Reference made to an "end" of a reactor merely refers to a distal portion of the reactor with respect to an axial mid-point of the reactor. Thus, to say that a gas enters or exits an "end" of the reactor, such as end 9, means merely that the gas may enter or exit substantially at any of the various points along an axis between the respective end face of the reactor and a mid-point of the reactor, but more preferably closer to the end face than to the mid-point. Thereby, one or both of the first and second reactant gases could enter at the respective end face, while the other is supplied to that respective end of the reactor through slots or ports in the circumferential or perimeter outer surface on the respective end of the reactor.

EXAMPLES

In the Examples below, when monoliths are used, the monoliths used for supporting the catalyst systems corresponded to monoliths with 400 cpsi (cells per square inch) and an open frontal area of either 35% or 52%.

Example 1—Phase Transitions for $NiO/NiAl_2O_4$

A sample of NiO and $NiAl_2O_4$ was placed on a platinum substrate. The sample on the substrate was then used for in-situ characterization by powder X-ray diffraction (PXRD) while exposing the sample to reducing and oxidizing environments. This allowed for characterization of the crystal phases (Ni, NiO, NiAl$_2$O$_4$, and Al$_2$O$_3$) that were present in the sample after exposure to varying amounts of reducing and oxidizing conditions.

The experiments in this example were conducted at 1300° C. The sample of NiO/NiAl$_2$O$_4$ was placed on a Pt strip which was used to heat the sample. An atmosphere of H$_2$, air, or N$_2$ was applied to the sample, according to the type of atmosphere (reducing, oxidizing, inert) that was used during a given time period.

The NiO/NiAl$_2$O$_4$ sample was first exposed to a reducing atmosphere (at 1300° C.) for a period of time, to allow for reduction of a substantial portion of NiO to Ni and NiAl$_2$O$_4$ to Ni and Al$_2$O$_3$. The atmosphere was then purged with N$_2$, followed by introduction of air (at 1300° C.) to allow for conversion of Ni back to NiO and then at least partially to NiAl$_2$O$_4$.

Figure 4:
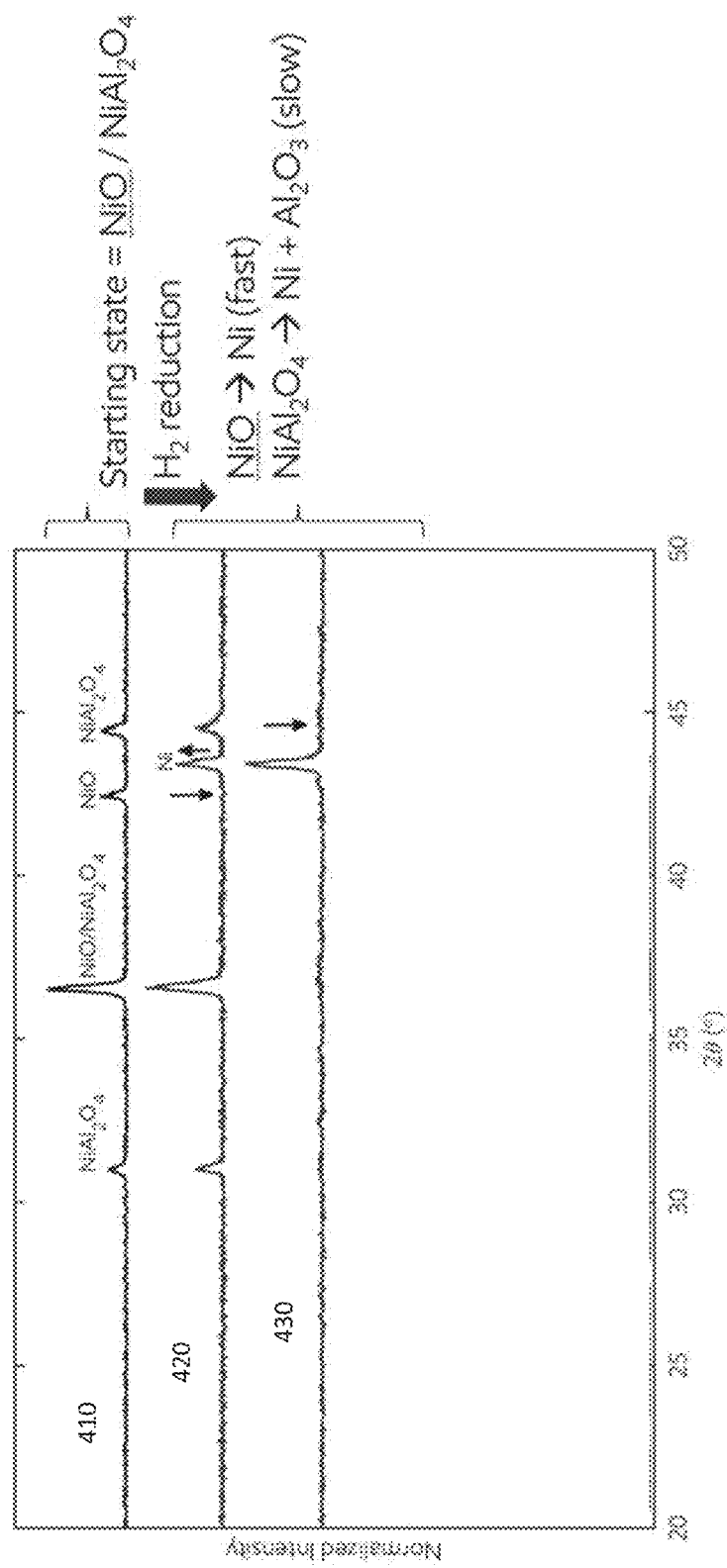
FIG. 4 shows PXRD spectra obtained in-situ during and after reduction of an NiO/NiAl$_2$O$_4$ sample.
Figure 5:
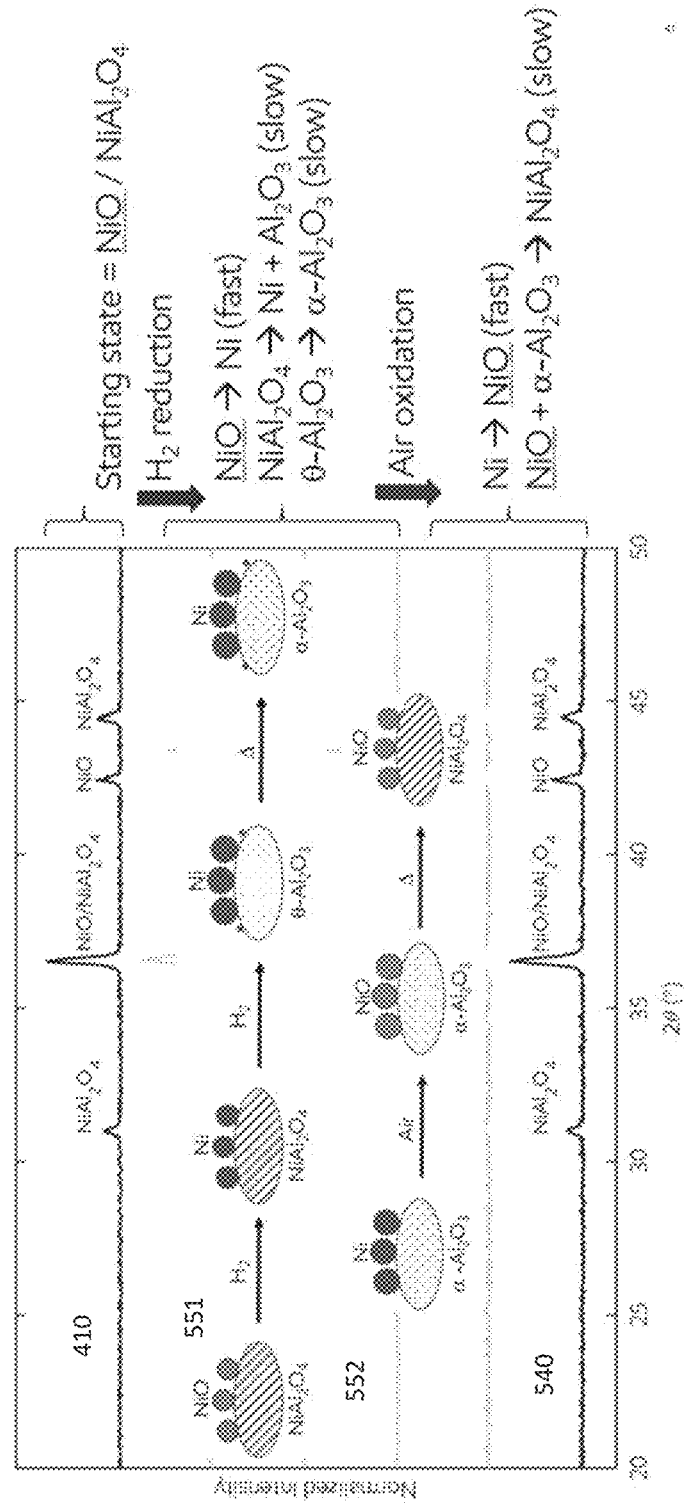
FIG. 5 shows PXRD spectra obtained in-situ after reduction and subsequent oxidation of an NiO/NiAl$_2$O$_4$ sample.

FIG. 4 and FIG. 5 shows PXRD spectra taken at various times during the experiments. FIG. 4 shows PXRD spectra for the portion of the process corresponding to exposing the sample to a reducing atmosphere. As shown in FIG. 4, prior to exposure to the reducing environment at 1300° C., the sample initially had a PXRD spectrum 410 that showed peaks for both NiO and NiAl$_2$O$_4$. The sample was then exposed to an H$_2$ atmosphere at 1300° C. for 13 minutes. Additional PXRD characterization was performed at 30 seconds, 1 minute, 5 minutes, and 13 minutes. After 30 seconds, the PXRD spectrum remained qualitatively similar to spectrum 410. Spectrum 420 shows the spectrum obtained after 1 minute of exposure to the reducing atmosphere. As shown in spectrum 420, the NiO peaks in the spectrum have disappeared, and a new peak corresponding to Ni is now visible. A peak for Al$_2$O$_3$ was not quite visible yet at this time. After additional exposure to the reducing atmosphere to reach a total of 13 minutes, spectrum 430 was obtained. As shown in spectrum 430, the only peak observable in this portion of the PXRD spectrum is the peak for Ni. (A peak for Al$_2$O$_3$ was also observed.) All of the NiO and NiAl$_2$O$_4$ has disappeared. Table 1 summarizes the results from the PXRD spectra obtained after 30 seconds, 1 minute, 5 minutes, and 13 minutes of exposure. Without being bound by any particular theory, it is noted that the NiO peaks in the PXRD spectrum disappeared first when exposed to a reducing atmosphere. The disappearance of the NiAl$_2$O$_4$ peaks took longer, indicating that the conversion of NiO to metallic Ni occurs relatively quickly in comparison with the conversion of NiAl$_2$O$_4$ to metallic Ni and Al$_2$O$_3$.

TABLE 1

PXRD Peak Formation and Disappearance During Reduction of NiO/NiAl$_2$O$_4$

| H$_2$ Reduction Time | Peak Formation | Peak Disappearance |
|---|---|---|
| 30 seconds | — | — |
| 1 minute | Ni | NiO |
| 5 minutes | Ni (also small amount of α-Al$_2$O$_3$) | NiO, NiAl$_2$O$_4$ |
| 13 minutes | Ni, α-Al$_2$O$_3$ | NiO, NiAl$_2$O$_4$ |

FIG. 5 contains additional PXRD spectra. In FIG. 5, spectra 410 corresponds to the spectrum for the NiO/NiAl$_2$O$_4$ sample prior to exposure to the reducing atmosphere. Spectrum 540 corresponds to a spectrum for the sample after exposure of the sample to 13 minutes of a reducing atmosphere, purging with N$_2$, and then exposure to air for 13 minutes. As shown in spectrum 540, exposure of the sample to air for a sufficient amount of time resulted in a PXRD spectrum 540 that was substantially similar to the spectrum 410. This demonstrates that the formation of Ni shown in FIG. 4 was substantially completely reversed after oxidation.

FIG. 5 also includes a depiction of a proposed mechanism for the conversion of NiO and NiAl$_2$O$_4$ to metallic Ni (row 551), and then conversion of the metallic Ni back into NiO and NiAl$_2$O$_4$ (row 552). As depicted in row 551, without being bound by any particular theory, it is believed that in a fully oxidized state, small domains of NiO are present on NiAl$_2$O$_4$. When exposed to reducing conditions, these domains of NiO are converted to Ni. After further exposure, the NiAl$_2$O$_4$ can be converted to Ni and Al$_2$O$_3$. During both of these reduction processes, sintering can occur to increase the domain size of the resulting Ni. With regard to the Al$_2$O$_3$, it is believed that the initial phase for the alumina is θ-Al$_2$O$_3$. After additional exposure to heat (reducing atmosphere not required), this θ-Al$_2$O$_3$ can be converted to α-Al$_2$O$_3$.

When the sample is then exposed to an oxidizing atmosphere (row 552), initially the Ni domains are at least partially converted to NiO. This may or may not result in a surface area change, but it is believed that any surface area change in the conversion to NiO is small relative to the subsequent surface area change. After conversion to NiO, the NiO is then combined with Al$_2$O$_3$ to form spinel phase NiAl$_2$O$_4$. By definition, forming a crystalline spinel phase containing NiAl$_2$O$_4$ requires dispersal of nickel away from larger domains and into the distributed crystalline NiAl$_2$O$_4$ structure. Without being bound by any particular theory, it is believed that this formation of NiAl$_2$O$_4$ is the mechanism that provides the "size-reversing" properties of the NiAl$_2$O$_4$ system.

Figure 6:
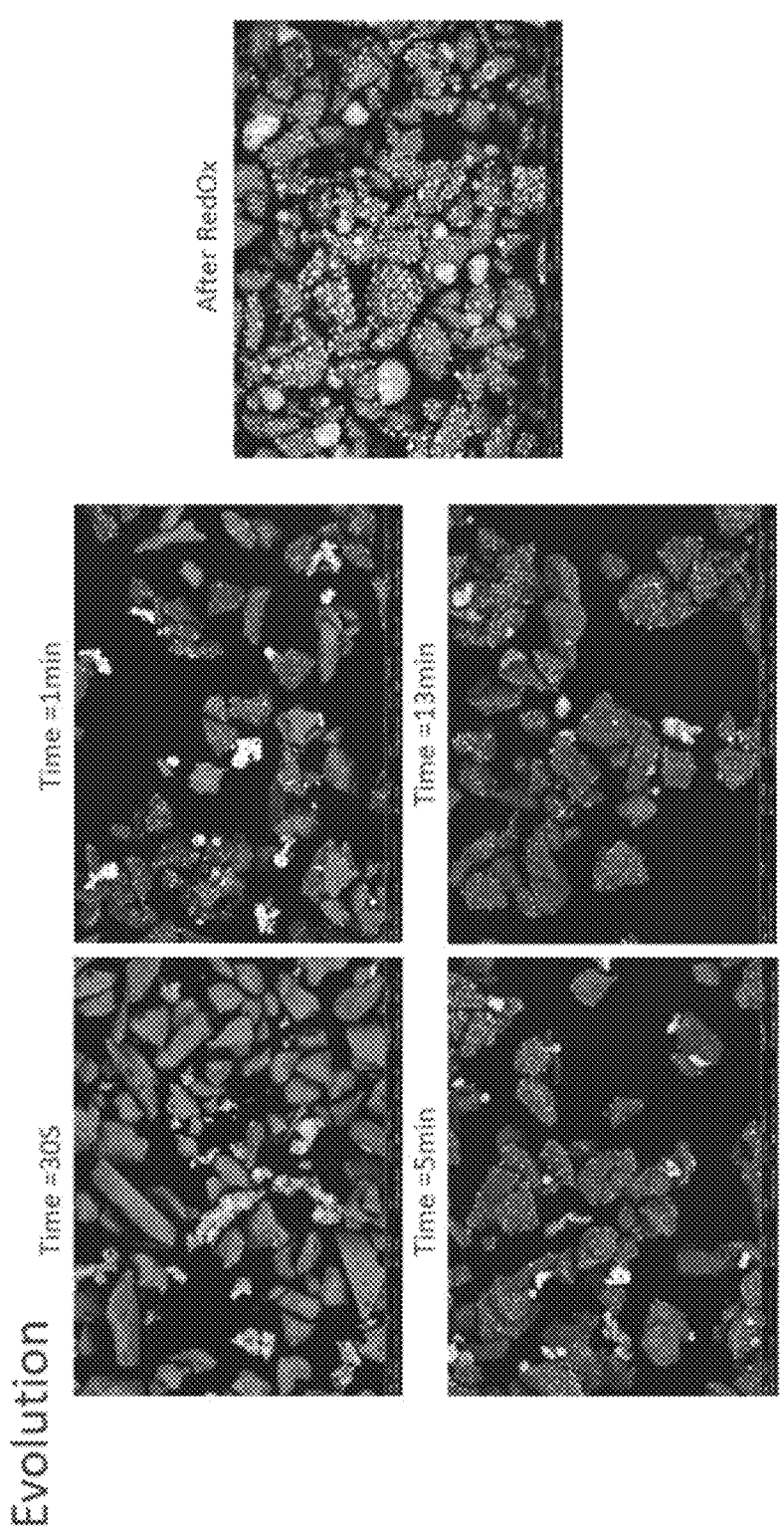
FIG. 6 shows SEM images after exposure to varying lengths of reducing conditions and after exposure to subsequent oxidation conditions.

To further illustrate the proposed mechanism, FIG. 6 shows SEM images from the sample after various exposures to the reducing atmosphere and then after full exposure of the reduced surface to the oxidizing atmosphere. FIG. 6 shows the time evolution of the Ni particle sizes of the sample after 30 seconds, 1 minute, 5 minutes, and 13 minutes of exposure to the reducing conditions at 1300° C. As shown in FIG. 6, initially smaller size domains of Ni were formed, but the domains increased in size with increasing exposure to elevated temperature. However, after exposure of the sample to a sufficient time under oxidizing conditions, the domain size on the surface is reduced.

Example 2—Temperature Dependence of Oxidation

Two samples of NiO and α-Al$_2$O$_3$ were prepare with a ratio of NiO to Al$_2$O$_3$ of 1:1.5. One sample was calcined at 1200° C. for 4 hours. After calcination, the ratio of Al$_2$O$_3$ to NiAl$_2$O$_4$ was 3.60, indicating that less than 25% of the Al$_2$O$_3$ was converted to NiAl$_2$O$_4$.

A second sample was calcined at 1300° C. for 4 hours. After calcination, the ratio of Al$_2$O$_3$ to NiAl$_2$O$_4$ was 0.07, indicating substantially complete conversion to the spinel phase. This illustrates the strong temperature dependence for the reaction that converts NiO and Al$_2$O$_3$ to the spinel phase. Based on this temperature dependence, little or no formation of spinel phase would occur under cyclic reforming conditions at temperatures below 1000° C. As a result, the size-reversing benefits of the NiAl$_2$O$_4$ system would not be achieved under lower temperature conditions.

Figure 8:
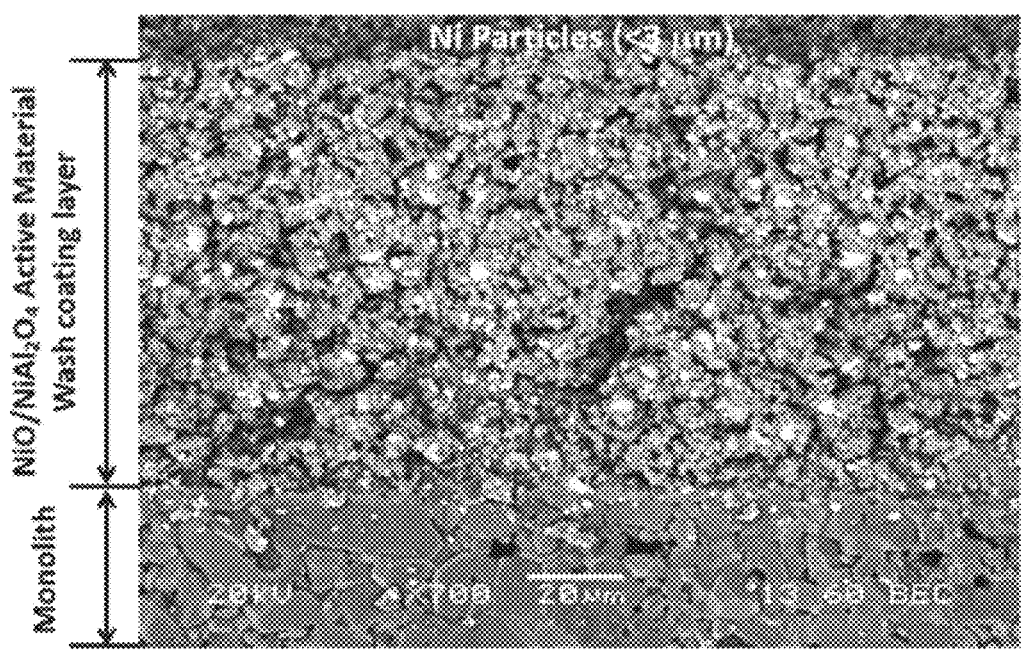
FIG. 8 shows an SEM image of an NiAl$_2$O$_4$ catalyst system washcoated on a monolith after exposure to cyclic reforming conditions.

Example 3A—NiO/Al$_2$O$_3$(NiAl$_2$O$_4$)

α-Al$_2$O$_3$ powder was dried in an oven overnight at 121° C. (~250° F.). The dried α-Al$_2$O$_3$ powder was then weighed, and mixed with the appropriate amount of NiO. This corresponded to a 1.5:1 Al:Ni mole ratio for the $NiO/Al_2O_3$ catalyst system. It is noted that this catalyst system can form $NiAl_2O_4$ in-situ after exposure to cyclic high temperature reforming conditions. The mixture was mixed in a Waring Blender. The blended material was then calcined at 1300° C. (2372° F.) in a Sentro Tech Furnace for 4 hours, using a ramp rate of 3° C./min, producing the desired $NiO/Al_2O_3$ catalyst system. The calcined material was allowed to cool to room temperature. The weight percent of catalytic metal (Ni) in the $NiO/Al_2O_3$ catalyst system was 38.8 wt % (relative to a weight of the catalyst system). The calcined $NiO/Al_2O_3$ catalyst system was further milled in a liquid to prepare appropriate slurry and washcoated on monoliths having 93 wt % $\alpha-Al_2O_3$, 5 wt % $SiO_2$ and 2 wt % MgO. The washcoated monoliths were further calcined at 1200° C. (2192° F.) for 2 hours to ensure complete adherence of the active material onto the monoliths. This corresponded to annealing at a temperature that was substantially similar to the peak temperature during the subsequent exposure of the monoliths to cyclic high temperature reforming conditions. The final washcoated monoliths were loaded at the highest temperature catalytic zone (e.g. 800~1250° C.) in a pilot scale reverse flow reactor unit and exposed to various cyclic process conditions for about 750 hours. FIG. 8 shows a scanning electron microscope (SEM) image of the NiO and $NiAl_2O_4$ materials that were present on the monoliths having 93 wt % $\alpha-Al_2O_3$, 5 wt % $SiO_2$ and 2 wt % MgO after 750 hrs. During the exposure to the various cyclic process conditions, the $NiAl_2O_4$ catalyst system provided steady and high methane conversion, good phase stability of the metal oxide support, insignificant sintering of active catalytic metals, and good adhesion to the monoliths.

Examples 3B and 3C—$NiAl_2O_4$ and $Al_2O_3$/$NiAl_2O_4$

Additional catalyst systems and corresponding washcoated monoliths were prepared according to the method in Example 3A, but with varying ratios of NiO to $Al_2O_3$. In Example 3B, the initial Al:Ni ratio was 2:1, resulting in a catalyst system with an Ni content of roughly 33.2 wt % (relative to the weight of the catalyst system). This roughly corresponds to the stoichiometric ratio for $NiAl_2O_4$. The catalyst system with the 2:1 ratio of Al:Ni was then washcoated on to a monolith with the same type of washcoat composition as the monolith in Example 3A, using a similar procedure. For Example 3C, the initial Al:Ni ratio was 3:1, so that excess $Al_2O_3$ was present in the catalyst system. This resulted in forming a catalyst system with an Ni content of roughly 25.8 wt %. The catalyst system was then deposited as a washcoat on a monolith with the same type of washcoat composition as used in Examples 3A and 3B.

Example 4—$Rh/\alpha-Al_2O_3$

Figure 9:
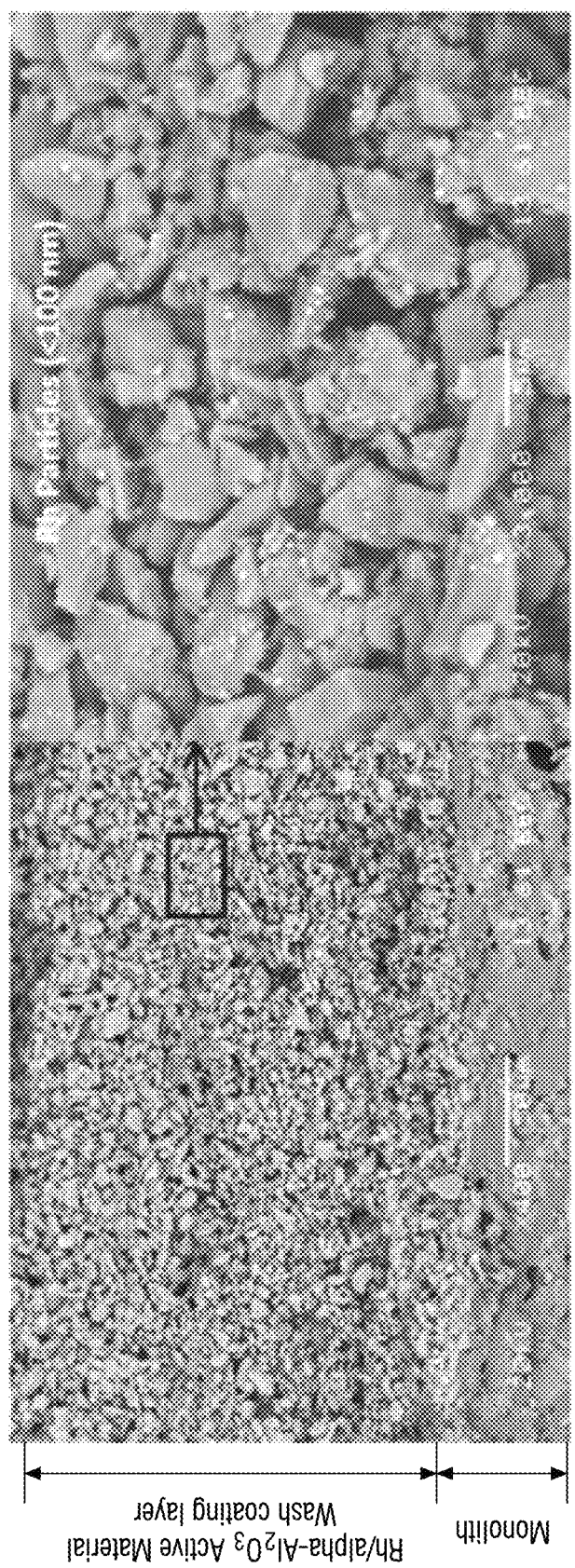
FIG. 9 shows SEM images of an Rh$_2$O$_3$/α-Al$_2$O$_3$ catalyst system washcoated on a monolith after exposure to cyclic reforming conditions for 750 hours.

In this example, the catalyst system corresponds to Rh ($Rh_2O_3$) as catalytic metal (oxide) and $\alpha-Al_2O_3$ as the metal oxide support layer. $\alpha-Al_2O_3$ corresponds to a "corundum" type oxide. To make this catalyst system, $\alpha-Al_2O_3$ powder was dried in an oven overnight at 121° C. (~250° F.). The dried $\alpha-Al_2O_3$ was then weighed, and small aliquot was taken in order to determine the absorption factor. A solution of rhodium (III) nitrate, $Rh(NO_3)_3 \cdot nH_2O$, aqueous solution containing 9.77 wt % Rh at 27.4% solids content, was mixed with the appropriate amount of excess $H_2O$ (as necessary), and sprayed/impregnated onto the $\alpha-Al_2O_3$. The material was then dried at 121° C. (250° F.) for at least 2 hrs. The dried material was then calcined at 500° C. (932° F.) in a Sentro Tech Furnace for 4 hours, using a ramp rate of 3° C./min, producing $Rh_2O_3/\alpha-Al_2O_3$. The calcined material was allowed to cool to room temperature. The weight percent of catalytic metal Rh was roughly 4.0 wt %. The calcined $Rh_2O_3/\alpha-Al_2O_3$ catalyst system was further milled in a solution to prepare appropriate slurry and washcoated on monoliths having 93 wt % $\alpha-Al_2O_3$, 5 wt % $SiO_2$ and 2 wt % MgO. The washcoated monoliths were further calcined at 500° C. (932° F.) for 2 hours to ensure complete adherence of the active material onto the monoliths. The final washcoated monoliths were loaded at the low temperature catalytic zone (e.g. 400~1050° C.) in a pilot scale reverse flow reactor unit and exposed to various cyclic process conditions for about 750 hours. The desired $Rh_2O_3/\alpha-Al_2O_3$ catalyst system had steady high methane conversion, good phase stability of the metal oxide support, reduced or minimized sintering of active catalytic metals, and good adhesion to the monolith. FIG. 9 shows scanning electron microscope (SEM) images of an example of the $Rh_2O_3/\alpha-Al_2O_3$ catalyst system washcoated on a monolith having 93 wt % $\alpha-Al_2O_3$, 5 wt % $SiO_2$ and 2 wt % MgO after 750 hrs.

Examples 5A, 5B, and 5C—Catalyst Systems with Different Starting Alumina Phases

Three different types of catalyst system washcoat preparations were used to prepare multi-zone catalyst systems for hydrocarbon reforming. In this Example, a multi-zone catalyst system was used, with two catalyst zones. A first zone (higher temperature) corresponded to a Ni-containing catalyst, while a second zone (lower temperature) corresponded to a Rh-containing catalyst. Two monoliths were used to fill the desired catalyst bed volume in each zone in the pilot scale reactor, so each catalyst system corresponded to a total of four monoliths.

For Example 5A, the first two monoliths with the Ni-containing catalyst system was prepared according to Example 3A. Thus, the catalyst was NiO while the alumina phase in the first two monoliths in Example 5A was $\alpha-Al_2O_3$. This type of catalyst system can result in in-situ formation of $NiAl_2O_4$ after exposure to cyclic high temperature reforming conditions. A sufficient washcoat was applied so that the weight of the $NiO/\alpha-Al_2O_3$ catalyst system was roughly 5 wt % of the total weight of the washcoated monolith. For Example 5A, the second two monoliths with the Rh-containing catalyst system were prepared according to Example 4. Thus, the alumina phase in the second two monoliths in Example 5A was $\alpha-Al_2O_3$. A sufficient washcoat was applied so that the weight of the $Rh_2O_3/\alpha-Al_2O_3$ catalyst system was roughly 4 wt % of the total weight of the washcoated monolith.

For Examples 5B and 5C, instead of using catalyst systems comprised of phase stable materials, a washcoat containing higher surface-area material was deposited on a monolith. Thus, the washcoats used in Examples 5B and 5C did not include a thermally stable metal oxide support layer.

In Example 5B, the catalyst system for the first two washcoats corresponded to $\theta-Al_2O_3$ doped with 4 wt % La, with 30% Ni as the catalyst, which was formed at 1200° C. This type of composition can be referred to as 30% Ni-4%-La-$\theta-Al_2O_3$. This catalyst system corresponds to a molar ratio of Al:Ni of 3.7:1. It is noted that this ratio has a substantial amount of excess Al relative to the stoichiometric ratio for $NiAl_2O_4$. After depositing the washcoat, the first two monoliths in Example 5B were calcined at 500° C. For the second two monoliths in Example 5B, a washcoat of 5% Rh on 4%-La-γ-Al$_2$O$_3$ was washcoated onto an alumina rich monolith. It is noted that the second two washcoats included γ-Al$_2$O$_3$ rather than the θ-Al$_2$O$_3$ of the first two washcoats. After depositing the washcoat, the second two monoliths in Example 5B were calcined at 500° C.

In Example 5C, the first two washcoats and second two washcoats were prepared in a manner similar to Example 5B, but the calcination temperature of the first two monoliths was different. In Example 5C, a calcination temperature of 1200° C. was used after applying the washcoat (as compared to the 500° C. used for calcination in Example 5B).

Example 6—Reforming with Monoliths with Different Starting Alumina Phases

The washcoated monoliths described in Examples 5A, 5B, and 5C were used in a pilot scale reactor to investigate changes in catalytic activity over time and to determine the structural stability of the washcoated monoliths. The monoliths were used to perform steam reforming on a methane feed under cyclic high temperature conditions. The reaction conditions included a regeneration step and a reforming step. During the regeneration step, air was used to provide the source of oxygen for combustion of hydrocarbon fuel. The amount of air was sufficient to provide a 10% excess of O$_2$ relative to the amount of hydrocarbon fuel used for heating. The regeneration step during each cycle was performed for roughly 15 seconds at a pressure of 150 psig (~1.0 MPa-g). The combustion during the regeneration step was performed to provide a temperature profile with a target peak temperature of 1150° C. at the end of the regeneration step/beginning of the reforming step. The reforming step during each cycle was performed for roughly 15 seconds at a pressure of 300 psig (~2.1 MPa-g), with methane as the hydrocarbon for reforming. The molar ratio of H$_2$O to CH$_4$ in the reforming step feed was 1.3.

Figure 10:
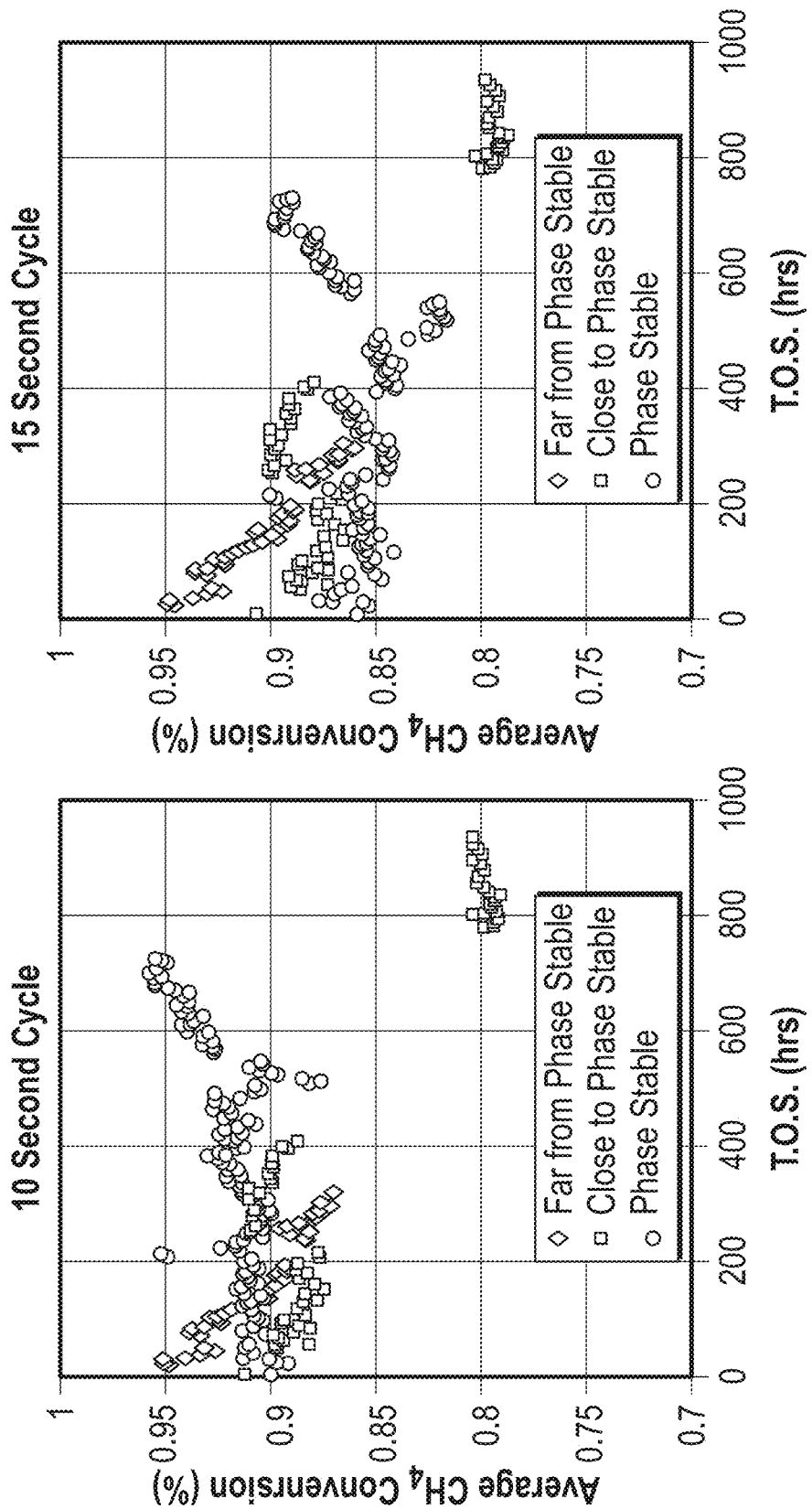
FIG. 10 shows conversion of methane during reforming under cyclic reforming conditions in the presence of various catalyst systems.

FIG. 10 shows the average conversion of methane during the reforming step (right plot) as the process is performed over a period of 4-6 weeks. Because of the impact of cooling in the reactor toward the end of a reforming step during a single cycle, the conversion rate at the end of the reforming step in each cycle is somewhat lower. This is illustrated by the difference in conversion when averaging over the first 10 seconds of each reforming step (left plot in FIG. 10) versus averaging over the first 15 seconds of each reforming step (right plot in FIG. 10). It is noted that a shorter reforming step could be used if it is desirable to maintain higher overall conversion for the full length of the reforming step.

As shown in the right plot in FIG. 10, both Example 5B and Example 5C initially provided higher conversion than Example 5A. This matches the expected effect of using the higher surface area phases of alumina as the support in Examples 5B and 5C. However, as shown in the right plot in FIG. 10, the activity for conversion of the catalysts in Examples 5B and 5C is not stable. While the data is noisy, it is clear that the conversion activity for the catalyst in Example 5C starts to decline almost immediately after start of run. This activity decline continues until about 300 hours of performing the cyclic reaction. At that point, the reaction in Example 5C was stopped due to the rapid loss of activity that was occurring. Example 5B has a more gradual decline in catalytic activity, but Example 5B also undergoes a substantial drop in activity that started well before 400 hours of time on service. Between 400 hours and 800 hours, an alternative set of cyclic reforming conditions were used that are not plotted in FIG. 10, but a similar drop in activity over time was observed. At 800 hours, the process conditions were restored to the initial reforming conditions. By 800 hours, the degradation of the catalyst appeared to stabilize, albeit at a significantly lower activity level than the catalyst of Example 5A. Again, this loss in activity is believed to be due to degradation of the catalyst system on the monolith in the reactor, resulting in loss of available surface area for the exposing the methane feed to the catalyst.

In contrast to Example 5B and Example 5C, the right plot in FIG. 10 shows that the catalyst system in Example 5A maintained similar activity throughout the full length of the process run. Without being bound by any particular theory, it is believed that this is due to Example 5A corresponding to a) monoliths made from a material that is phase stable under the cyclic high temperature reforming conditions and b) the monoliths including an oxide support layer, so that any interaction between a catalyst metal (such as Ni) and an oxide material (such as Al$_2$O$_3$) occurs in the oxide support layer, and does not impact the structural integrity of the underlying monolith or other support structure.

The left plot in FIG. 10 shows similar results. Again, Example 5C initially shows higher activity than Example 5A, but the activity for Example 5C started to decline almost immediately. Examples 5A and 5B initially had similar activity, but only Example 5A maintained that activity. As shown in both plots in FIG. 10, Example 5A maintained substantially the same activity for a run length of 750 hours.

In order to further characterize the results from performing cyclic reforming for the catalyst system and monolith from Example 5A, at the end of the run, alternating oxidation and reduction cycles were maintained while the peak temperature in the reactor was cooled to 1000° C. An N$_2$ flow was then used to cool the reactor down to room temperature. After cooling, additional characterization was then performed.

After cooling, it was initially noted that for the first and second monolith of Example 5A, the catalyst system was difficult to remove from the underlying monolith. Due to structural breakdown, it is typically relatively easy to separate a catalyst or catalyst system from a monolith when the catalyst or catalyst system does not include a thermally stable metal oxide. However, it was unexpectedly found that by using a thermally phase stable support metal oxide in the catalyst system, strong adhesion of the catalyst system to the monolith could be maintained after extended exposure to the cyclic high temperature reforming environment.

After removal, the catalyst system from Example 5A was characterized using X-ray diffraction (XRD). The XRD spectra indicated that all of the catalyst systems were in stable phases. For the first monolith, the catalyst system was primarily in a reduced state. This was indicated based on the presence of substantial peaks for Ni and α-Al$_2$O$_3$ while little NiAl$_2$O$_4$ was present. The catalyst system for the second monolith was more oxidized, with a mixture of Ni, NiO, α-Al$_2$O$_3$, and NiAl$_2$O$_4$ being present. The XRD spectra for the third and fourth monoliths were similar to each other, with both showing primarily Rh and α-Al$_2$O$_3$. Additional microscopic analysis and elemental analysis of the catalyst systems was consistent with the XRD spectra.

Example 7—Modification of Excess Oxygen in Regeneration Step

Figure 7:
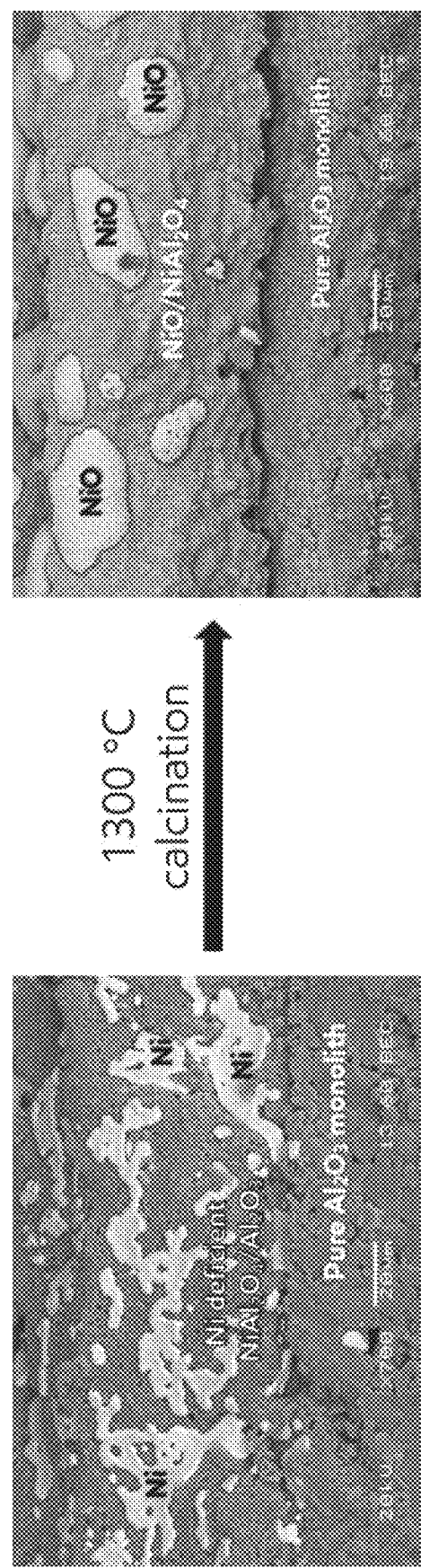
FIG. 7 shows SEM images of a NiAl$_2$O$_4$ catalyst system coated on a monolith after exposure to cyclic reforming conditions and after exposure to subsequent oxidation conditions.

Prior to removing the catalyst system from the first two monoliths of Example 5A, SEM micrographs were obtained of the surface of the catalyst system on the monoliths. The left SEM image in FIG. 7 is a representative image of the micrographs. As shown in Example 6, substantial sintering of the Ni on the surface of the monolith had occurred. It was noted in Example 6 that the first monolith was in a primarily reduced state, while the second monolith was in a partially reduced state. Without being bound by any particular theory, it is believed that the sintering observed in the left SEM image in FIG. 6 was due to incomplete oxidation of Ni metal during the regeneration step under the regeneration conditions for the process cycle used in Example 6.

The first two monoliths in Example 5A included a total of 11.64 grams of Ni, or 0.198 moles of Ni. Thus, complete oxidation of the amount of Ni on the first two monoliths to form NiO (or $NiAl_2O_4$) would require 0.099 moles of $O_2$. For complete reduction of all of the Ni on the first two monoliths (assuming the Ni was in the form of NiO or $NiAl_2O_4$), 0.198 moles of $H_2$ would be required.

The cyclic reforming conditions included a combustion step and a reforming step. The combustion step was 15 seconds long at a pressure of 150 psig (~1.0 MPa-g). Air was used to provide the oxidant. The flow rate of air during combustion was 6.77 standard cubic feet per minute, which corresponds to 0.424 moles of $O_2$ over the course of 15 seconds. This corresponded to 110% of the stoichiometric oxygen need for complete combustion of the fuel used during the combustion step, which means that (at most) 0.042 moles of excess oxygen were available for oxidation of any metallic Ni present in the reactor. It is noted that a portion of this excess oxygen could also potentially be consumed via combustion of coke that forms on interior surfaces of the reactor during reforming.

The reforming step was 15 seconds long at 300 psig (~2.1 MPa-g). Methane was used as the hydrocarbon feed at a flow rate of 2.0 scfm, which corresponded to 0.597 moles of $CH_4$ introduced into the reactor during the reforming step. As noted above, only 0.099 moles of $H_2$ would be needed to completely reduce the Ni in the reactor. This amount of $H_2$ would be generated at a $CH_4$ conversion level of only 11%. The reforming conditions were selected to provide roughly 90% or more conversion of the $CH_4$. Thus, a substantial excess of $H_2$ was present during the reforming step relative to the amount of $H_2$ needed for converting NiO or $NiAl_2O_4$ into metallic Ni.

In Example 6, a 10% excess of $O_2$ was used relative to the stoichiometric amount for combustion (i.e., an excess molar amount of oxygen of 10%). Based on the total amount of Ni metal within the pilot scale reactor, the 10% excess molar amount of oxygen (relative to the stoichiometry for combustion) corresponded to roughly 42% of the amount of oxygen that would be needed to convert all Ni within the first two monoliths from Ni metal to NiO. Given the amount of hydrogen present within a reforming environment, it is believed that substantially all of the exposed Ni in the reactor was converted from NiO to Ni over time during the reforming steps of the reaction cycles, and then only a portion of the Ni metal was being converted back to NiO during the regeneration steps.

After roughly 1 month of exposure to the cyclic reforming conditions, ex-situ SEM analysis of the hottest Ni-coated monolith showed significant sintering of the $NiO/NiAl_2O_4$ material, as indicated by large regions of metallic Ni on top of $Al_2O_3$ (i.e., Ni-deficient material) in the catalyst system layer. The first SEM micrograph shown in FIG. 7 provides an example of the large, sintered regions of metallic Ni.

The large sintered areas of Ni metal and corresponding Ni-depleted regions of $Al_2O_3$ in the catalyst system in the first SEM micrograph in FIG. 7 can be understood based on the relative reducing potential and oxidizing potential of the conditions during the reforming step of the reaction cycle (and/or other steps in the reaction cycle that correspond to a reducing environment). As detailed above, during the reforming step, a substantial excess of $H_2$ was available. By contrast, the excess oxygen during the combustion step corresponded to only enough oxygen for oxidation of 42% of the Ni in the reactor. Due to this disparity in the amount Ni that could be converted under the reducing conditions and the oxidation conditions in the reaction cycle, over time a large portion of the Ni in the reactor remained in the metallic (reduced) state during each cycle, thus providing long time periods for sintering to form larger domains of Ni. The first SEM micrograph in FIG. 7 is consistent with this analysis.

In order to provide evidence that a high temperature oxidative process would allow for oxidation of Ni and redispersion to $NiAl_2O_4$, the monolith was exposed to calcination conditions at 1300° C. in the presence of air for 4 hours. The second SEM micrograph shown in FIG. 7 shows an example of the change in the structure of the catalyst system. As shown in the second SEM micrograph in FIG. 7 (and as confirmed by elemental analysis), Ni was oxidized to NiO. Additionally, the $Al_2O_3$ matrix of the catalyst system was transformed into a mixture of $NiO/NiAl_2O_4$. This formation of $NiAl_2O_4$ requires atomic redispersion of Ni, as indicated by the much broader distribution for the $NiAl_2O_4$ in the second micrograph in FIG. 7, as compared with the locations of the Ni regions in the first micrograph in FIG. 7.

To further test this hypothesis, additional reactor runs were performed using a second group of monoliths that were substantially the same in composition as the monoliths from Example 5A. The second group of monoliths were used to perform methane reforming under two sets of process conditions. First, the second group of monoliths was used to perform methane reforming under the same conditions used in Example 6. This corresponded to having a molar amount of excess $O_2$ used during the regeneration step of roughly 10% relative to the stoichiometric amount for combustion. After characterizing the amount of conversion using the conditions in Example 7, the process cycle was changed so that the molar amount of excess $O_2$ was roughly 30% during the regeneration step.

Figure 11:
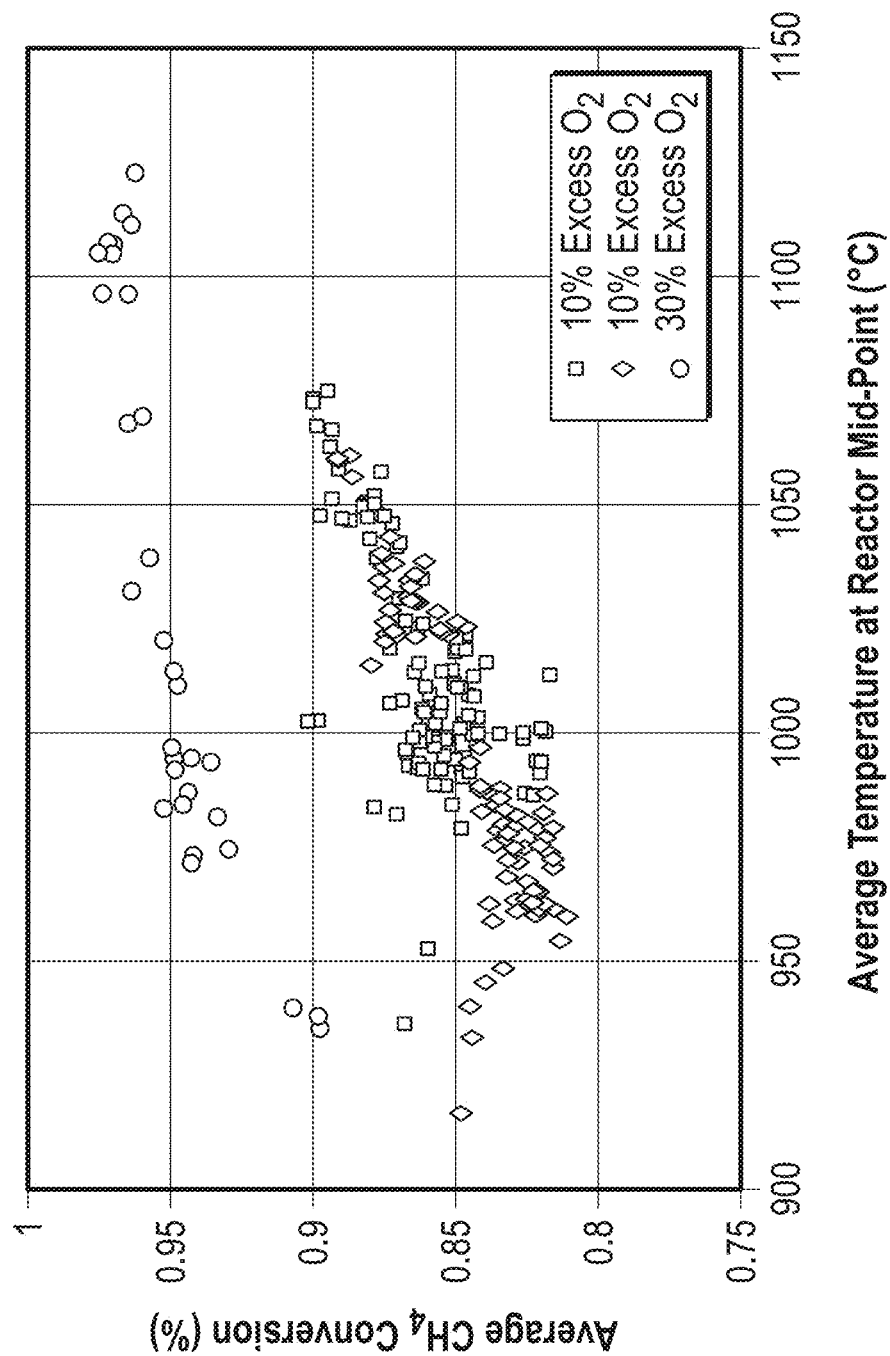
FIG. 11 shows conversion of methane during reforming under cyclic reforming conditions in the presence of various catalyst systems.

During each process cycle, the temperature of the midpoint of the reactor was recorded along with the average methane conversion during the first 10 seconds. FIG. 11 shows the results from using 10% molar excess $O_2$ and 30% molar excess $O_2$ with the second group of monoliths. For comparison, similar data from Example 6A is also displayed in FIG. 11. As shown in FIG. 11, using 10% molar excess $O_2$ using the new monoliths resulted in substantially the same level of methane conversion, relative to the reactor midpoint temperature, as was observed in Example 6. However, a substantial increase in conversion was observed when the amount of $O_2$ in the regeneration step was increased to a molar excess of 30%. It is noted that a molar excess of roughly 24% would have provided the minimum stoichiometric amount of $O_2$ needed to oxidize all Ni in the reactor from Ni metal to NiO (or equivalently $NiAl_2O_4$). As shown in FIG. 11, using a sufficient molar excess of $O_2$ to fully oxidize all Ni in the reactor resulted in a substantial activity improvement. This is consistent with the re-dispersion shown in the second SEM image in FIG. 7.

It is noted that the size-reversing benefits of conversion to the spinel phase ($NiAl_2O_4$) are further enhanced relative to a conventional cycle based on the nature of both sintering and formation of the spinel phase. Sintering is a relatively slow process that is accelerated at higher temperatures. When substantial amounts of Ni remain in the metallic state and then are exposed to the peak temperatures that occur during one or more steps of a reaction cycle for performing reforming, the amount of sintering is increased. However, conversion of NiO and $Al_2O_3$ to spinel phase $NiAl_2O_4$ also increases sharply with increased temperature. Thus, by providing sufficient oxygen to allow for substantially complete oxidation of Ni to NiO and/or $NiAl_2O_4$, the portions of a catalyst system that conventionally would be most susceptible to sintering can instead receive the highest amount of re-dispersion benefit from formation of the spinel phase $NiAl_2O_4$.

Example 8—Ni/YSZ on Monolith Composed of $NiAl_2O_4$

An additional test run was performed in the pilot scale reactor where the first two monoliths were composed of $NiAl_2O_4$. For the first two monoliths, an intermediate bonding layer of $Al_2O_3$ was provided on the $NiAl_2O_4$ monoliths, followed by a Ni/YSZ catalyst system. The catalyst system washcoat corresponded to roughly 5 wt % of the total weight of the combined catalyst system and monolith. The third and fourth monoliths were similar to the third and fourth monoliths from Example 5A. Thus, the third and fourth monoliths included a washcoat of a $Rh/\alpha$-$Al_2O_3$ catalyst system on a monolith composed of $\alpha$-$Al_2O_3$.

Figure 12:
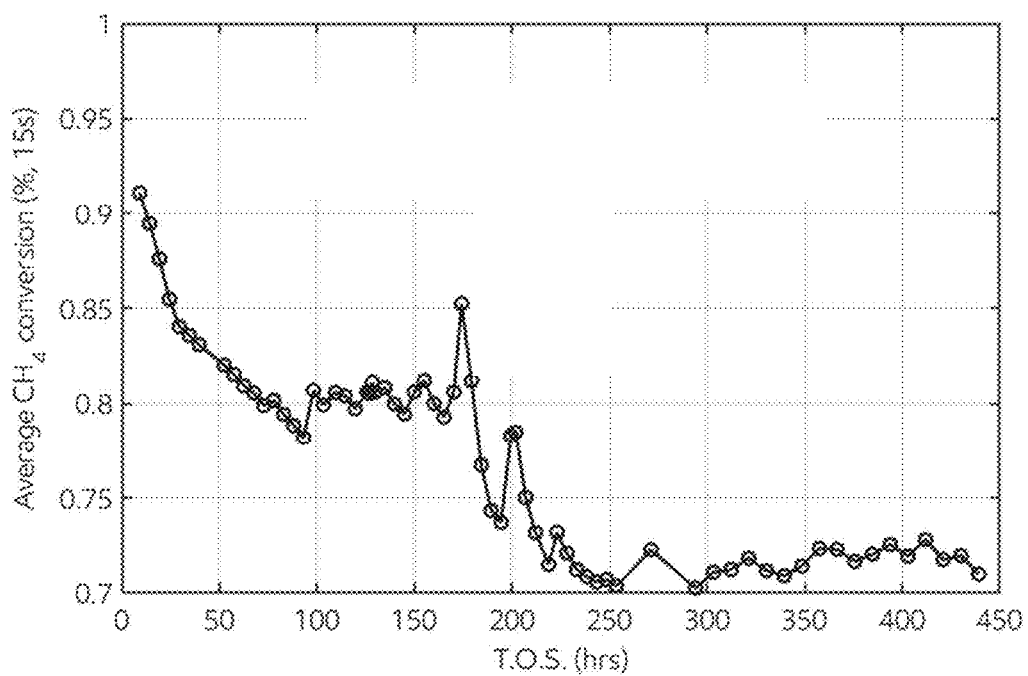
FIG. 12 shows conversion of methane during reforming under cyclic reforming conditions in the presence of a catalyst system supported on a monolith composed of NiAl$_2$O$_4$.

The monoliths were then exposed to cyclic high temperature reforming conditions similar to those for Example 6. FIG. 12 shows the methane conversion during the course of the text run. As shown in FIG. 12, the catalytic activity was initially good, indicating that Ni/YSZ in combination with $Rh/\alpha$-$Al_2O_3$ can be used effectively in multiple zones to achieve desirable reforming activity. However, after roughly 200 hours of exposure, the reforming activity dropped substantially. This is believed to be due to collapse of the first and second monoliths. The collapse of the first and second monoliths was visually confirmed after the test run was finished. Without being bound by any particular theory, it is believed that the cyclic oxidation and reduction environment caused rapid conversion of the underlying $NiAl_2O_4$ monolith between states of $NiAl_2O_4$ and ($Ni+Al_2O_3$). This cycling between states is believed to cause the structural breakdown of the monolith. Thus, although $NiAl_2O_4$ can potentially be used to construct a monolith, the benefits of using $NiAl_2O_4$ for reforming in a cyclic high temperature reforming environment cannot be realized over extended run lengths when $NiAl_2O_4$ is used as a monolith material. Instead, as shown in Example 7, using $NiAl_2O_4$ (preferably in the form $NiO/NiAl_2O_4$) as a catalyst system deposited on a phase stable monolith provides unexpectedly superior structural stability.

It is noted that even after the collapse of monoliths 1 and 2, substantial conversion of methane was still performed. This is believed to be due to the reforming activity provided by the $Rh/\alpha$-$Al_2O_3$ catalyst system on the $\alpha$-$Al_2O_3$ monoliths used for monoliths 3 and 4.

Additional Embodiments

Embodiment 1. A method for reforming hydrocarbons, comprising: reacting a mixture comprising fuel and 0.1 vol % or more of $O_2$ under combustion conditions in a combustion zone within a reactor to heat one or more surfaces in a reaction zone to a regenerated surface temperature of 800° C. or more, the reaction zone comprising a catalyst system supported on one or more surfaces of a support structure, the catalyst system comprising M and $Al_2O_3$, where M is a metal from Groups 3 to 12 of the Periodic Table, the catalyst system optionally further comprising at least one of MO and $MAl_2O_4$; exposing the catalyst system to a gas flow to convert at least a portion of the M and $Al_2O_3$ to MO, $MAl_2O_4$, or a combination thereof, the gas flow comprising 100 mol % to 250 mol % of a stoichiometric molar amount of $O_2$ for conversion of a molar amount of M in the catalyst system from metallic M to MO, $MAl_2O_4$, or a combination thereof exposing a reactant stream comprising a reformable hydrocarbon to the one or more surfaces in the reaction zone to increase the temperature of the reactant stream; and exposing the reactant stream to the catalyst system in the reaction zone at a temperature of 800° C. or more to form a product stream comprising $H_2$ and to convert at least a portion of the MO, $MAl_2O_4$, or a combination thereof to metallic M.

Embodiment 2. The method of Embodiment 1, wherein M comprises Ni, and wherein the one or more surfaces are heated to a regenerated surface temperature of 1000° C. or more.

Embodiment 3. The method of any of the above embodiments, wherein the 0.1 vol % or more of $O_2$ comprises an excess of $O_2$ of 20 mol % or more relative to the stoichiometric amount of $O_2$ for combustion of the fuel, and wherein the exposing the catalyst system to a gas flow comprises exposing the catalyst system to the 0.1 vol % or more of $O_2$.

Embodiment 4. The method of any of the above embodiments, wherein the 0.1 vol % or more of $O_2$ comprises an excess of $O_2$ of 30 mol % or more relative to the stoichiometric amount of $O_2$ for combustion of the fuel.

Embodiment 5. The method of any of the above embodiments, wherein exposing the catalyst system to the gas flow comprises: after the reacting the mixture under combustion conditions, exposing the catalyst system to a catalyst regeneration flow comprising $O_2$.

Embodiment 6. The method of any of the above embodiments, wherein the combustion conditions comprise a combustion time, and wherein exposing the catalyst system to the gas flow comprises: periodically extending the combustion time so that the catalyst system is exposed to 100% or more of a stoichiometric amount for combustion of the fuel and 100% or more of a stoichiometric amount of conversion of the molar amount of M in the catalyst system from metallic M to MO, $MAl_2O_4$, or a combination thereof.

Embodiment 7. The method of Embodiment 6, wherein periodically extending the combustion time comprises extending the combustion time at least once for every 10 instances of the reacting the mixture under combustion conditions.

Embodiment 8. The method of any of the above embodiments, wherein the reacting the mixture, the exposing the catalyst system to the gas flow, the exposing reactant stream to the one or more surfaces in the reaction zone, and the exposing the reactant stream to the catalyst system comprise cyclic reforming conditions.

Embodiment 9. The method of any of the above embodiments, wherein the reactor comprises a cyclic reaction environment, a reverse flow reactor, or a combination thereof.

Embodiment 10. A method for reforming hydrocarbons in a cyclic reaction environment, comprising: reacting a mixture comprising fuel and $O_2$ under combustion conditions in a combustion zone within a reactor to heat one or more surfaces in a reaction zone to a regenerated surface temperature of 1000° C. or more, the mixture of fuel and $O_2$ comprising 120% or more of a stoichiometric molar amount of $O_2$ for combustion of the fuel, the reaction zone comprising a catalyst system supported on one or more surfaces of a support structure, the catalyst system comprising i) Ni and $Al_2O_3$, ii) NiO and $Al_2O_3$, iii) $NiAl_2O_4$, or iv) a combination of two or more of i), ii) and iii); exposing a reactant stream comprising a reformable hydrocarbon to the one or more surfaces in the reaction zone to increase the temperature of the reactant stream; and exposing the reactant stream to the catalyst system in the reaction zone at a temperature of 1000° C. or more to form a product stream comprising $H_2$, a direction of flow for the reactant stream within the reaction zone being reversed relative to a direction of flow for the mixture.

Embodiment 11. The method of Embodiment 10, wherein supporting the catalyst system on one or more surfaces of the support structure comprises: forming a washcoat suspension comprising the catalyst system; and exposing the one or more surfaces of the support structure to the washcoat suspension to support the catalyst system on the one or more surfaces of the support structure.

Embodiment 12. The method of Embodiment 10, wherein the metal oxide support layer comprises one or more metal oxides, and wherein forming the catalyst system comprises mixing a powder comprising the catalyst with a powder comprising the one or more metal oxides of the metal oxide support layer, the powder comprising the one or more metal oxides of the metal oxide support layer having a surface area of 20 $m^2$/g or less.

Embodiment 13. The method of any of Embodiments 10 to 12, wherein the 0.1 vol % or more of $O_2$ comprises 125% to 200% of a stoichiometric molar amount of $O_2$ for combustion of the fuel.

Embodiment 14. The method of any of the above embodiments, wherein the $Al_2O_3$ comprises α-$Al_2O_3$.

Embodiment 15. The method of any of the above embodiments, wherein the reacting the mixture comprises heating the one or more surfaces in the reaction zone to a temperature of 1200° C. or more.

Additional Embodiment A. A method for reforming hydrocarbons, comprising: reacting a mixture comprising fuel and 0.1 vol % or more of $O_2$ under combustion conditions in a combustion zone within a reactor to heat one or more surfaces in a reaction zone to a regenerated surface temperature of 1000° C. or more, the reaction zone comprising a catalyst system supported on one or more surfaces of a support structure, the catalyst system comprising i) Ni and $Al_2O_3$, ii) NiO and $Al_2O_3$, iii) $NiAl_2O_4$, or iv) a combination of two or more of i), ii) and iii); exposing the catalyst system to a gas flow comprising 100 mol % to 250 mol % of a stoichiometric molar amount of $O_2$ for conversion of the molar amount of Ni in the catalyst system from metallic Ni to NiO, $NiAl_2O_4$, or a combination thereof; exposing a reactant stream comprising a reformable hydrocarbon to the one or more surfaces in the reaction zone to increase the temperature of the reactant stream; and exposing the reactant stream to the catalyst system in the reaction zone at a temperature of 1000° C. or more to form a product stream comprising $H_2$.

Additional Embodiment B. The method of claim 10, wherein the combustion conditions comprise a combustion time, and wherein exposing the catalyst system to the gas flow comprises: periodically extending the combustion time so that the catalyst system is exposed to 100% or more of a stoichiometric amount for combustion of the fuel and 100% or more of a stoichiometric amount of conversion of the molar amount of Ni in the catalyst system from metallic Ni to NiO, $NiAl_2O_4$, or a combination thereof.

Additional Embodiment C. The method of any of the above embodiments, wherein the 0.1 vol % or more of $O_2$ comprises an excess of $O_2$ of 30 mol % or more relative to the stoichiometric amount of $O_2$ for combustion of the fuel, and wherein the exposing the catalyst system to a gas flow comprises exposing the catalyst system to the 0.1 vol % or more of $O_2$.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for reforming hydrocarbons, comprising:
reacting a mixture comprising fuel and 0.1 vol % or more of $O_2$ under combustion conditions in a combustion zone within a reactor to heat one or more surfaces in a reaction zone to a regenerated surface temperature of 1100° C. or more, the reaction zone comprising a catalyst system supported on one or more surfaces of a support structure, the catalyst system comprising i) Ni and $Al_2O_3$, ii) NiO and $Al_2O_3$, iii) $NiAl_2O_4$, or iv) a combination of two or more of i), ii) and iii);
exposing the catalyst system to a gas flow comprising 100 mol % to 250 mol % of a stoichiometric molar amount of $O_2$ for conversion of the molar amount of Ni in the catalyst system from metallic Ni to NiO, $NiAl_2O_4$, or a combination thereof;
exposing a reactant stream comprising a reformable hydrocarbon to the one or more surfaces in the reaction zone to increase the temperature of the reactant stream; and
exposing the reactant stream to the catalyst system in the reaction zone at a temperature of 1000° C. or more to form a product stream comprising $H_2$,
wherein the combustion conditions comprise a combustion time, and wherein exposing the catalyst system to the gas flow comprises: periodically extending the combustion time so that the catalyst system is exposed to 100% or more of a stoichiometric amount for combustion of the fuel and 100% or more of a stoichiometric amount of conversion of the molar amount of Ni in the catalyst system from metallic Ni to NiO, $NiAl_2O_4$, or a combination thereof.

2. The method of claim 1, wherein exposing the catalyst system to the gas flow comprises: after the reacting the mixture under combustion conditions, exposing the catalyst system to a catalyst regeneration flow comprising $O_2$.

3. The method of claim 1, wherein periodically extending the combustion time comprises extending the combustion time at least once for every 10 instances of the reacting the mixture under combustion conditions.

4. The method of claim 1, wherein the reactor comprises a cyclic reaction environment, a reverse flow reactor, or a combination thereof.

5. The method of claim 1, wherein the reacting the mixture comprises heating the one or more surfaces in the reaction zone to a temperature of 1200° C. or more.

6. A method for reforming hydrocarbons in a cyclic reaction environment, comprising:
reacting a mixture comprising fuel and 0.1 vol % $O_2$ or more under combustion conditions in a combustion zone within a reactor to heat one or more surfaces in a reaction zone to a regenerated surface temperature of 1100° C. or more, the mixture of fuel and $O_2$ comprising 120% or more of a stoichiometric molar amount of $O_2$ for combustion of the fuel, the reaction zone comprising a catalyst system supported on one or more surfaces of a support structure, the catalyst system comprising i) Ni and $Al_2O_3$, ii) NiO and $Al_2O_3$, iii) $NiAl_2O_4$, or iv) a combination of two or more of i), ii) and iii);

exposing a reactant stream comprising a reformable hydrocarbon to the one or more surfaces in the reaction zone to increase the temperature of the reactant stream; and exposing the reactant stream to the catalyst system in the reaction zone at a temperature of 1000° C. or more to form a product stream comprising $H_2$, a direction of flow for the reactant stream within the reaction zone being reversed relative to a direction of flow for the mixture.

7. The method of claim 6, wherein the catalyst system comprises a washcoat supported on one or more surfaces of the support structure.

8. The method of claim 6, wherein supporting the catalyst system on one or more surfaces of the support structure comprises:
   forming a washcoat suspension comprising the catalyst system; and
   exposing the one or more surfaces of the support structure to the washcoat suspension to support the catalyst system on the one or more surfaces of the support structure.

9. The method of claim 6, wherein the $Al_2O_3$ comprises α-$Al_2O_3$.

10. The method of claim 6, wherein the 0.1 vol % or more of $O_2$ comprises 125% to 200% of a stoichiometric molar amount of $O_2$ for combustion of the fuel.

11. The method of claim 6, wherein the reacting the mixture comprises heating the one or more surfaces in the reaction zone to a temperature of 1200° C. or more.

12. A method for reforming hydrocarbons, comprising:
   reacting a mixture comprising fuel and 0.1 vol % or more of $O_2$ under combustion conditions in a combustion zone within a reactor to heat one or more surfaces in a reaction zone to a regenerated surface temperature of 1100° C. or more, the reaction zone comprising a catalyst system supported on one or more surfaces of a support structure, the catalyst system comprising i) Ni and $Al_2O_3$, ii) NiO and $Al_2O_3$, iii) $NiAl_2O_4$, or iv) a combination of two or more of i), ii) and iii);

exposing the catalyst system to a gas flow comprising 100 mol % to 250 mol % of a stoichiometric molar amount of $O_2$ for conversion of the molar amount of Ni in the catalyst system from metallic Ni to NiO, $NiAl_2O_4$, or a combination thereof;

exposing a reactant stream comprising a reformable hydrocarbon to the one or more surfaces in the reaction zone to increase the temperature of the reactant stream; and exposing the reactant stream to the catalyst system in the reaction zone at a temperature of 1000° C. or more to form a product stream comprising $H_2$, wherein the 0.1 vol % or more of $O_2$ comprises an excess of $O_2$ of 20 mol % or more relative to the stoichiometric amount of $O_2$ for combustion of the fuel, and wherein the exposing the catalyst system to a gas flow comprises exposing the catalyst system to the 0.1 vol % or more of $O_2$.

13. The method of claim 12, wherein the 0.1 vol % or more of $O_2$ comprises an excess of $O_2$ of 30 mol % or more relative to the stoichiometric amount of $O_2$ for combustion of the fuel.

14. The method of claim 12, wherein the combustion conditions comprise a combustion time.

15. The method of claim 14, wherein exposing the catalyst system to the gas flow comprises: periodically extending the combustion time so that the catalyst system is exposed to 100% or more of a stoichiometric amount for combustion of the fuel and 100% or more of a stoichiometric amount of conversion of the molar amount of M in the catalyst system from metallic M to MO, $MAl_2O_4$, or a combination thereof.

16. The method of claim 12, wherein the reacting the mixture, the exposing the catalyst system to the gas flow, the exposing reactant stream to the one or more surfaces in the reaction zone, and the exposing the reactant stream to the catalyst system comprise cyclic reforming conditions.

* * * * *